United States Patent
Hinckley et al.

(10) Patent No.: US 7,518,596 B2
(45) Date of Patent: Apr. 14, 2009

(54) METHOD AND APPARATUS FOR COMPUTER INPUT USING SIX DEGREES OF FREEDOM

(75) Inventors: Kenneth P. Hinckley, Kirkland, WA (US); Michael J. Sinclair, Kirkland, WA (US); Richard S. Szeliski, Bellevue, WA (US); Matthew J. Conway, Seattle, WA (US); Erik J. Hanson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 10/982,079

(22) Filed: Nov. 4, 2004

(65) Prior Publication Data

US 2005/0093824 A1 May 5, 2005

Related U.S. Application Data

(62) Division of application No. 09/563,088, filed on Apr. 28, 2000, now Pat. No. 6,844,871.

(60) Provisional application No. 60/163,847, filed on Nov. 5, 1999.

(51) Int. Cl.
*G09G 5/00* (2006.01)
*G09G 5/08* (2006.01)
*G06F 3/033* (2006.01)

(52) U.S. Cl. .................................. 345/163; 345/156

(58) Field of Classification Search ............... 345/156, 345/163; 434/114; 369/97; 358/473
See application file for complete search history.

(56) References Cited

U.S. PATENT DOCUMENTS

| 4,390,873 | A |   | 6/1983  | Kirsch ..................... 340/710 |
|-----------|---|---|---------|-------------------------------------|
| 4,570,250 | A | * | 2/1986  | Gabritsos et al. ............. 369/97 |
| 4,797,544 | A |   | 1/1989  | Montgomery et al. ....... 250/221 |
| 4,804,949 | A |   | 2/1989  | Faulkerson ................. 340/710 |
| 5,095,303 | A |   | 3/1992  | Clark et al. ................. 345/164 |
| 5,181,181 | A |   | 1/1993  | Glynn ....................... 345/163 |
| 5,186,629 | A | * | 2/1993  | Rohen ....................... 345/163 |
| 5,414,534 | A |   | 5/1995  | Bindon ...................... 358/483 |
| 5,446,481 | A |   | 8/1995  | Gillick et al. ............... 345/163 |
| 5,477,237 | A |   | 12/1995 | Parks ........................ 345/163 |
| 5,526,022 | A |   | 6/1996  | Donahue et al. ............ 324/253 |

(Continued)

OTHER PUBLICATIONS

U.S. Appl. No. 09/217,403, filed Dec. 21, 1998, Adan et al.

(Continued)

*Primary Examiner*—Kevin M Nguyen
(74) *Attorney, Agent, or Firm*—Theodore M. Magee; Westman, Champlin & Kelly, P.A.

(57) ABSTRACT

A computer input device and computer system are provided that determine a height of the computer input device over a surface. Based on the height, an audio signal generator generates an audio driver signal. The audio driver signal is applied to an audio signal generate that generates an audio signal based on the audio driver signal.

10 Claims, 31 Drawing Sheets

U.S. PATENT DOCUMENTS

| | | | | |
|---|---|---|---|---|
| 5,694,153 | A | 12/1997 | Aoyagi et al. | 345/161 |
| 5,767,840 | A | 6/1998 | Selker | 345/161 |
| 5,798,750 | A | 8/1998 | Ozaki | 345/173 |
| 5,826,842 | A | 10/1998 | Paulse et al. | 248/118.1 |
| 5,831,597 | A | 11/1998 | West et al. | 345/163 |
| 5,877,748 | A | 3/1999 | Redlich | 345/163 |
| 5,926,169 | A * | 7/1999 | Church et al. | 345/163 |
| 5,936,612 | A | 8/1999 | Wang | 345/164 |
| 5,994,710 | A | 11/1999 | Knee et al. | 250/557 |
| 6,036,094 | A | 3/2000 | Goldman et al. | 235/462.45 |
| 6,069,594 | A | 5/2000 | Barnes et al. | 345/7 |
| 6,088,019 | A * | 7/2000 | Rosenberg | 345/156 |
| 6,115,028 | A | 9/2000 | Balakrishnan et al. | 345/157 |
| 6,172,354 | B1 | 1/2001 | Adan et al. | 250/221 |
| 6,184,867 | B1 | 2/2001 | Kandogan et al. | 345/161 |
| 6,198,462 | B1 | 3/2001 | Daily et al. | 345/8 |
| 6,243,096 | B1 | 6/2001 | Takanashi | 345/419 |
| 6,246,390 | B1 | 6/2001 | Rosenberg | 345/156 |
| 6,249,360 | B1 * | 6/2001 | Pollard et al. | 358/473 |
| 6,304,252 | B1 | 10/2001 | Elledge | 345/179 |
| 6,392,632 | B1 | 5/2002 | Lee | 345/158 |
| 6,445,378 | B1 | 9/2002 | Flagg | 345/163 |
| 6,611,139 | B1 | 8/2003 | Jackson | 324/207.2 |
| 2005/0264531 | A1 | 12/2005 | Tai et al. | 345/163 |

OTHER PUBLICATIONS

Balakrishnan, R. et al., "The Rockin' Mouse: Integral 3D Manipulation on a Plane," CHI 97, pp. 311-318 (Mar. 22-27, 1997).

Rekimoto, J., "Tilting Operations for Small Screen Interfaces (Tech Note)," UIST' 96, pp. 167-168 (1996).

MacKenzie, I. et al., "A Two-Ball Mouse Affords Three Degrees of Freedom," Extended Abstracts of CHI '97, pp. 303-304 (1997).

Steed, A. et al., "3D Interaction with the Desktop Bat," Computer Graphics forum, vol. 14, No. 2, pp. 97-104 (1995).

Slater, M. et al., "Liberation from Flatland: 3D Interaction Based on the Desktop Bat," Eurographics '91, pp. 209-221 (1991).

Kyuma, K. et al, "Artificial Retinas—Fast, Versatile Image Processors," Product Review, 2 pages (undated).

U.S. Appl. No. 10/982,285, filed Nov. 4, 2004, Hinckley et al.
U.S. Appl. No. 10/982,284, filed Nov. 4, 2004, Hinckley et al.
U.S. Appl. No. 10/982,631, filed Nov. 4, 2004, Hinckley et al.
U.S. Appl. No. 10/982,078, filed Nov. 4, 2004, Hinckley et al.

Hinckley, et al., "The Videomouse: A Camera-based Multi-degree-of-freedom Input Device," 1999, ACM New York, NY, Symposium on User Interface Software and Technology, pp. 1-10.

Eric Woods et al., "MagicMouse: An Inexpensive 6-degree-of-freedom mouse 2003," ACM New York, NY, Computer Graphics and Interactive Techniques in Australasia and South East Asia, pp. 1-2.

http://en.wikipedia.org/wiki/Image_scanner, pp. 1-5.

* cited by examiner

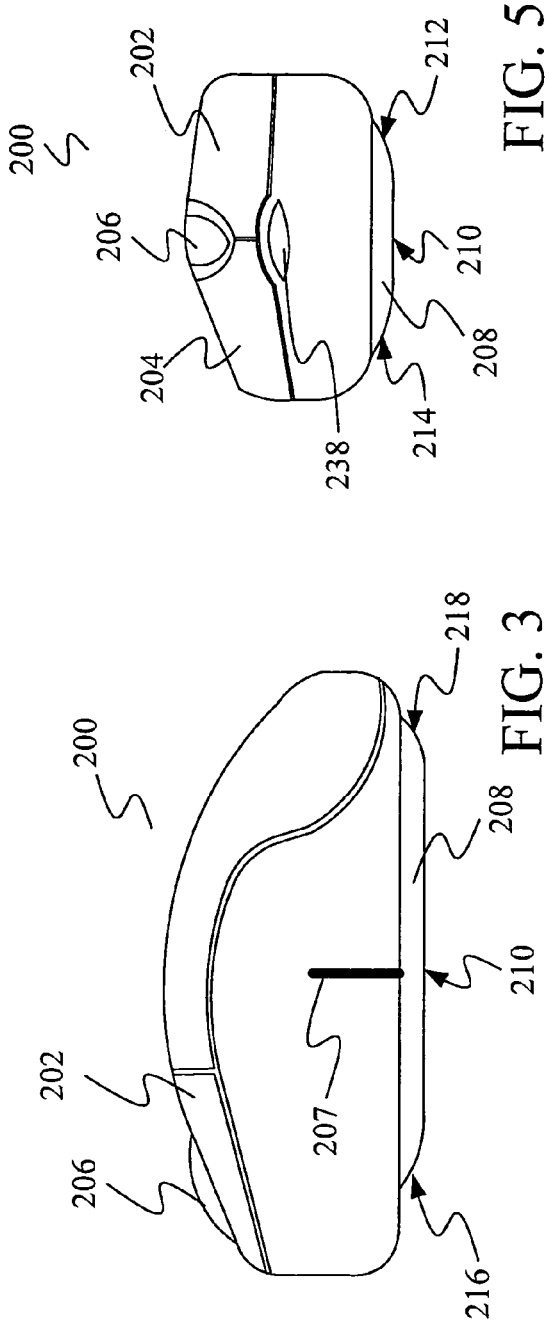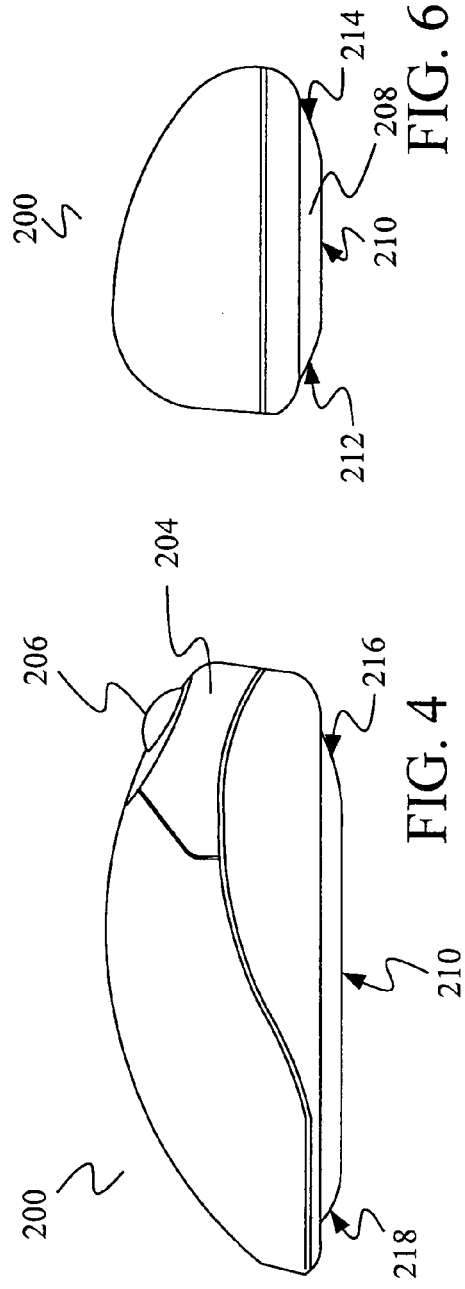

| | A | B | C | D | E | | | | | | | | |
|---|---|---|---|---|---|---|---|---|---|---|---|---|---|
| 1 | | | | ACCOUNTS | | | | | | | | | |
| 2 | | | | PAYABLE | | | | | | | | | |
| 3 | | | | | | | | | | | | | |
| 4 | | | | | | | | | | | | | |
| 5 | | | | | | | | | | | | | |
| 6 | | | | 74 | | | | | | | | | |
| 7 | | | | 25 | | | | | | | | | |
| 8 | | | | | | | | | | | | | |
| 9 | | | | | | | | | | | | | |
| 10 | | | | | | | | | | | | | |
| 11 | | | | | | | | | 86 | | | | |
| 12 | | | | | | | | | | | | | |
| 13 | | | | | | | | | | | | | |
| 14 | | | | | | | | | | | | | |
| 15 | | | | | | | | | | | 1009 | | |
| 16 | | | | | | | | | | | | | |
| 17 | | | | | | | | | | | | | |

| | C | D | E | | | | | | | |
|---|---|---|---|---|---|---|---|---|---|---|
| | | ACCOUNTS | | | | | | | | |
| | | PAYABLE | | | | | | | | |
| | | | | | | | | | | |
| | | 74 | | | | | | | | |
| | | 25 | | | | | | | | |
| | | | | | | | | | | |

732

METHOD AND APPARATUS FOR COMPUTER INPUT USING SIX DEGREES OF FREEDOM

REFERENCE TO RELATED APPLICATIONS

The present application is a divisional of and claims priority from U.S. patent application Ser. No. 09/563,088, filed Apr. 28, 2000, which claims priority from a U.S. Provisional Application having Ser. No. 60/163,847, filed on Nov. 5, 1999, and entitled METHOD AND APPARATUS FOR COMPUTER INPUT USING SIX DEGREES OF FREEDOM.

BACKGROUND OF THE INVENTION

The present invention relates to human-computer interfaces. In particular, the present invention relates to computer input devices.

In computer systems, many tasks such as navigation, three-dimensional object manipulation, and image editing can require multiple degrees of freedom (DOF) of rotation, zooming, or translation. Conventional mice, however, allow integrated control of only two degrees of freedom at any one time. While three dimensional/six degree of freedom input devices are available, such devices are difficult to use for standard two-dimensional cursor control. In the prior art, some mice have been augmented with wheels or joysticks for added degrees of freedom, but typically these controls are dedicated to secondary tasks such as scrolling or panning. Thus, all prior art input devices have limitations in a workflow that may frequently switch between two-dimensional pointing tasks and multi-degrees of freedom manipulations. Input devices and interaction techniques that can enhance the directness and degree of manipulation possible in such a workflow are therefore needed.

In the prior art, there are several multi-degree of freedom input devices available. However, each of these devices requires expensive orientation detection systems in order to detect the position and orientation of the mouse. In particular, most of these systems require a magnetic field generated by an active tablet or other magnetic source. Position and orientation information is detected by a magnetic sensor (typically in the form of one or more magnetic coils) which is embedded in the input device. For example, one input device being sold as the "Intuos 4D Mouse" from Wacom uses a tablet-based rotation-sensing puck. Other magnetic six degree-of-freedom input devices include the Polhemus Fastrak and the Ascension Flock of Birds, which have been used for six degrees of freedom input on an ActiveDesk display surface. Still other devices provide four degrees of freedom using an active sensing tablet that measures the (x, y) position of the device as well as the degree to which the device is tilted forward-back or left-right.

In all cases where an active sensing tablet or a magnetic field source/sensor pair is used to sense the orientation of the input device, the input device is very expensive. As such, an input device that can sense its orientation without expensive sensing equipment is needed.

The prior art also includes a two-ball mouse, which senses changes in rotation about its vertical axis. However this mouse is only able to sense three degrees of freedom and cannot measure absolute rotation of the mouse, only changes in the rotation of the mouse. One reference of the prior art has suggested combining the two-ball mouse with the tablet-based tilt-sensing mouse to produce a five-degree of freedom mouse. However, this combination would still result in an expensive tablet-based mouse.

SUMMARY OF THE INVENTION

A computer input device and computer system are provided that determine a height of the computer input device over a surface. Based on the height, an audio signal generator generates an audio driver signal. The audio driver signal is applied to an audio signal generate that generates an audio signal based on the audio driver signal.

BRIEF DESCRIPTION OF THE DRAWINGS

FIG. 3 is a left side view of a mouse of one embodiment of the present invention.

FIG. 4 is a right side view of a mouse of one embodiment of the present invention.

FIG. 5 is a front view of a mouse of one embodiment of the present invention.

FIG. 6 is a back view of a mouse of one embodiment of the present invention.

FIG. 50 shows a display containing a portion of a two-dimensional spreadsheet.

FIG. 51 shows a display containing a full image of a spreadsheet.

FIG. 52 shows a display containing a full image of a spreadsheet with a moveable semi-transparent region.

FIG. 53 shows a display containing only a portion of a spreadsheet.

DETAILED DESCRIPTION OF ILLUSTRATIVE EMBODIMENTS

Figure 1:
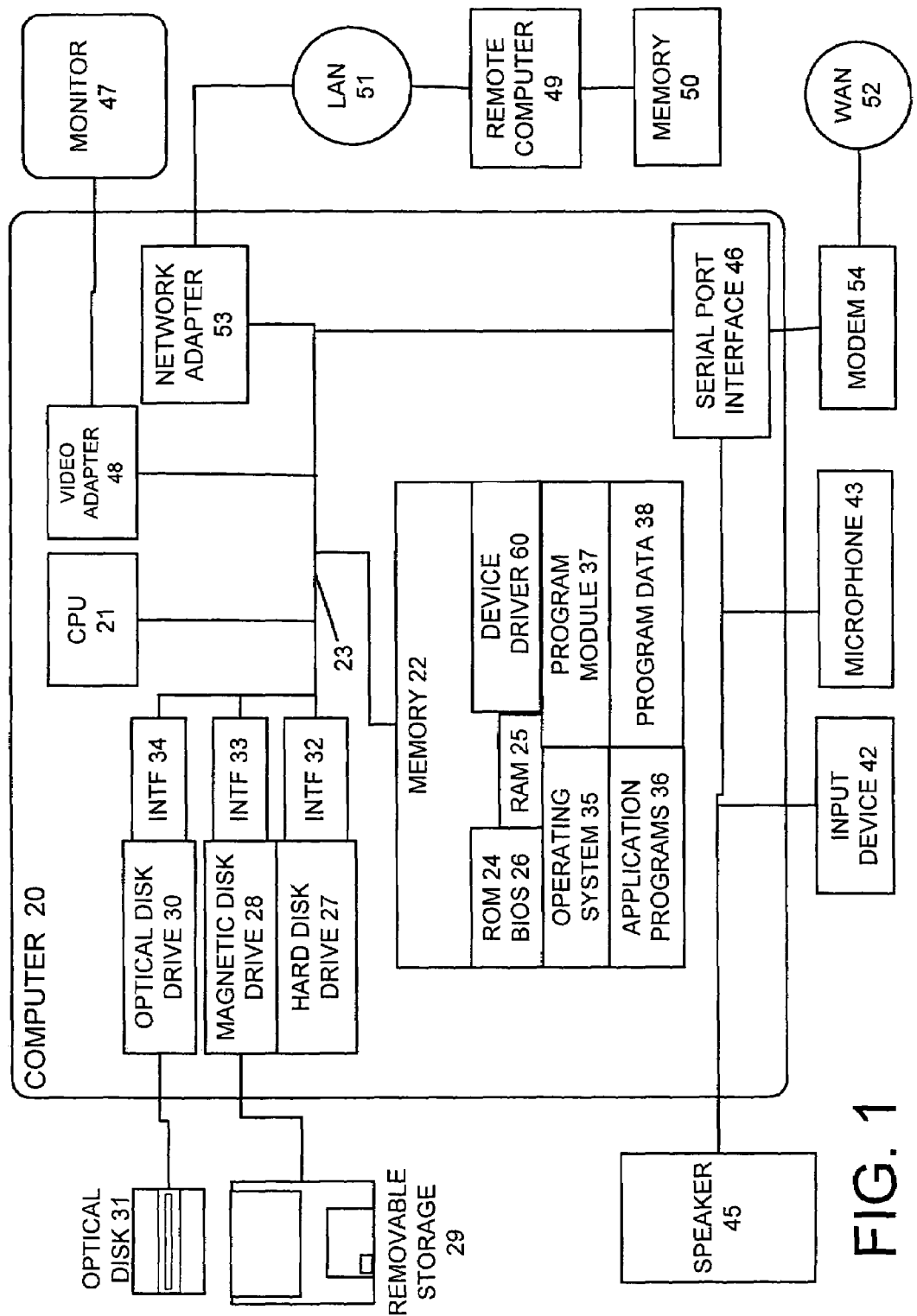
FIG. 1 is a general computing environment in which the present invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Structure of the Mouse

Figure 2:
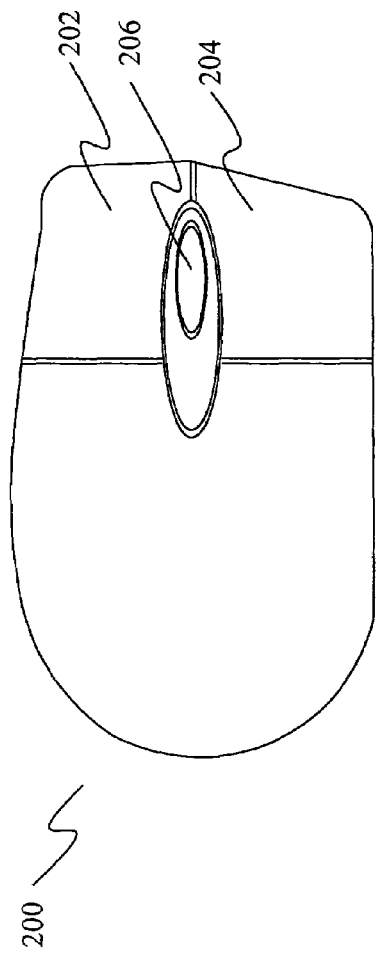
FIG. 2 is a top view of a mouse of one embodiment of the present invention.

FIG. 2 provides a top view of a mouse 200, which is one embodiment of a six degree of freedom input device under the present invention. Mouse 200 includes left button 202, right button 204, and depressible and rotatable wheel 206. FIGS. 3, 4, 5, and 6 provide left, right, front and back views of mouse 200 that all show a rocker base 208 along the bottom of mouse 200. Rocker base 208 includes a flat central area 210 that is surrounded by left and right curved surfaces 212 and 214 (FIGS. 5 and 6) and front and back curved surfaces 216 and 218 (FIGS. 3 and 4). The different areas of rocker base 208 are best shown in the bottom view of mouse 200 provided by FIG. 7. Under the embodiment of FIG. 7, curved surfaces 212, 214, 216, and 218 together form a continuous curved surface that surrounds flat surface 210. Under one embodiment, rocker base 208 is formed so that if mouse 200 is released while tilted, it quickly rights itself so that it is always ready for reuse.

Figure 7:
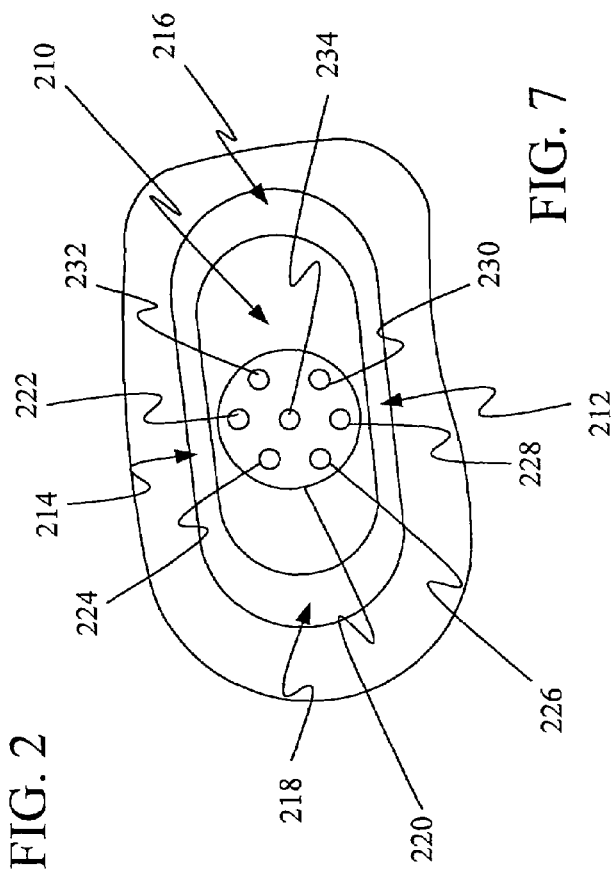
FIG. 7 is a bottom view of a mouse of one embodiment of the present invention.

As shown in FIG. 7, the bottom of mouse 200 includes an aperture 220 that exposes a set of six light emitting diodes (LEDs) 222, 224, 226, 228, 230, and 232 and a camera 234. In the embodiment of FIG. 7, the LEDs are shown surrounding camera 234, however, the invention is not limited to this layout and the LEDs may be placed in other locations relative to camera 234. In addition, although six LEDs are shown in FIG. 7, other embodiments of the invention may use fewer or more LEDs. Other embodiments may also use illumination devices other than LED's. In one embodiment, camera 234 is a 320×240 Charge Coupled Device (CCD) camera and the six LED's are red LED's that match the quantum (best) efficiency of the CCD camera.

Figure 8:
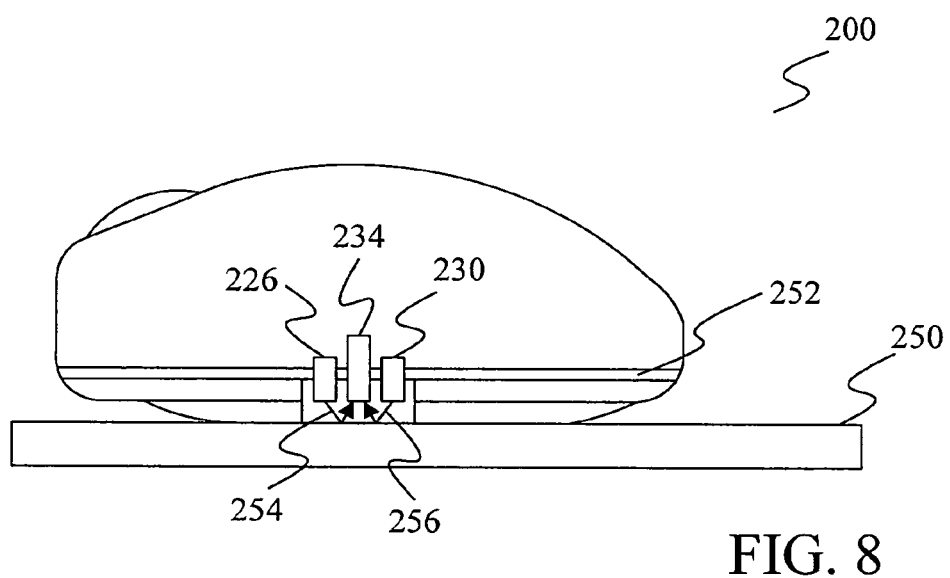
FIG. 8 is a side cross-sectional view of a mouse of one embodiment of the present invention.

FIG. 8 shows a cross-sectional side view of mouse 200 positioned over a surface 250. In FIG. 8, camera 234 and LEDs 226 and 230 are shown supported by a printed circuit board 252. Although only LEDs 226 and 230 are shown in FIG. 8, those skilled in the art will recognize that the other four LED's are present but not shown in FIG. 8. For the purposes of FIG. 8, the operation of these unseen LEDs is similar to that of LEDs 226 and 230 as described below. Light rays 254 and 256 emitted by LEDs 226 and 230 are projected toward surface 250 and are reflected into camera 234. As discussed further below, these light rays are captured by camera 234 to form an image of surface 250.

In most embodiments, the input device is connected to host computer 262 through a connection port in the device such as connection port 238 of FIG. 5. Under some embodiments, the connection is a hardwire connection between the device and the host computer. In other embodiments, the connection is an infrared or RF (radio frequency) communication link between the device and the host computer.

Figure 9:
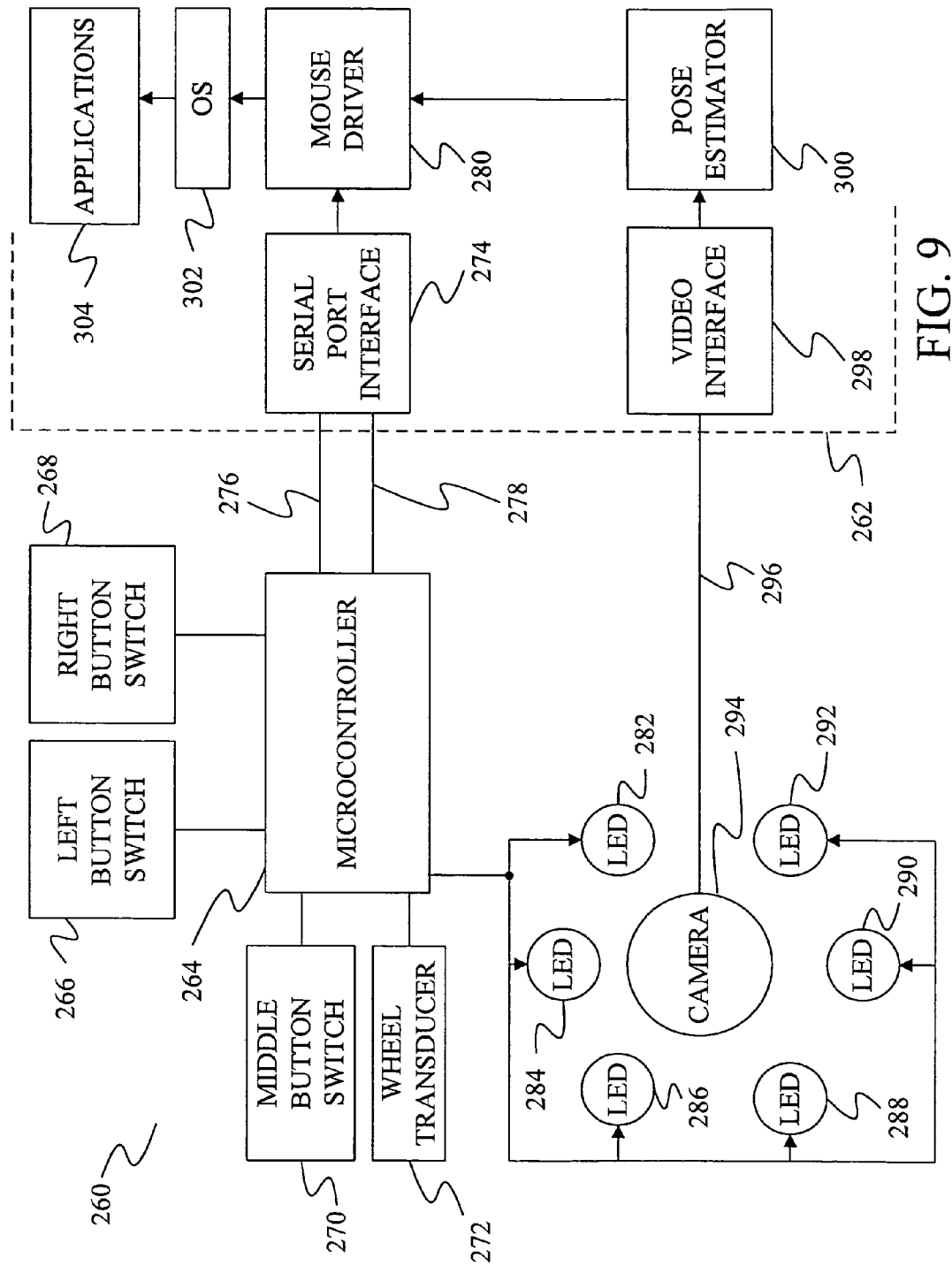
FIG. 9 is a block diagram of a mouse and a computer of one embodiment of the present invention.

FIG. 9 provides a block diagram of one embodiment of a mouse 260 and a host computer 262 of the present invention. In FIG. 9, a microcontroller 264 in mouse 260 receives electrical signals from a collection of switches and transducers that includes left button switch 266, right button switch 268, middle button switch 270 and wheel transducer 272. These signals are indicative of whether the respective button is being depressed or the amount by which the wheel is being rotated. Upon detecting a change in the state of a button or the wheel, microcontroller 264 generates a mouse packet that describes the current state of each of the mouse buttons and the distance the wheel has been rotated. The mouse packet is transmitted to a serial port interface 274 in computer 262 along communication lines 276 and 278. Although a serial interface is shown in FIG. 9, those skilled in the art will recognize that other interface may be used with the present invention such as a Universal Serial Bus (USB) interface. Interface 274 places the packet on an internal bus within computer 262 and routes the packet to a mouse driver 280, which in most embodiments is a software component.

Some embodiments of the mouse also include a touch sensor that can detect when the user is holding the mouse. This can be used to ignore slight sensor noise when the user is not holding the mouse. It can also be used to ensure the mouse is at rest before recalibrating the resting (flat) orientation of the mouse. In such embodiments, signals from the touch sensors are provided to microcontroller 264, which adds the state of the touch sensors to the mouse packet.

Mouse 260 also includes a set of six LEDs 282, 284, 286, 288, 290, and 292 that are controlled by microcontroller 264. Light from the LEDs is reflected off the working surface and into a camera 294, which generates a video signal along a video line 296. The video signal is provided to a video interface 298 in computer 262. Video interface 298 converts the video signal into frames of digital data, with each frame representing a separate captured image of the working surface. The frames of image data are in turn provided to a pose estimator 300 that determines the orientation of mouse 260 based on the images. In one embodiment, video interface 298 and pose estimator 300 are integrated together on an Osprey video capture card. The operation of pose estimator 300 is discussed further below.

The output of pose estimator 300 is a position and orientation packet that is provided to mouse driver 280. Mouse driver 280 combines the position and orientation information with the state of the various buttons and wheels on the mouse to produce one or more mouse event messages. In embodiments that utilize an operating system such as Windows 95®, Windows 98®, Windows CE®, Windows NT®, or Windows® 2000 from Microsoft Corporation of Redmond Wash., the event messages are routed to an operating system 302. Operating system 302 then routes the event messages to one or more applications 304 that have registered with operating system 302 to receive such messages or that are displaying a window beneath a cursor on the display.

In some embodiments, this packet contains additional information, such as a confidence measure that indicates the probability that the detected image is a mouse pad grid pattern. This can be used to detect when a mouse is removed from a mouse pad and used to scan some other surface as discussed further below. In most such embodiments, the confidence measure is provided by pose estimator 300.

Figure 10:
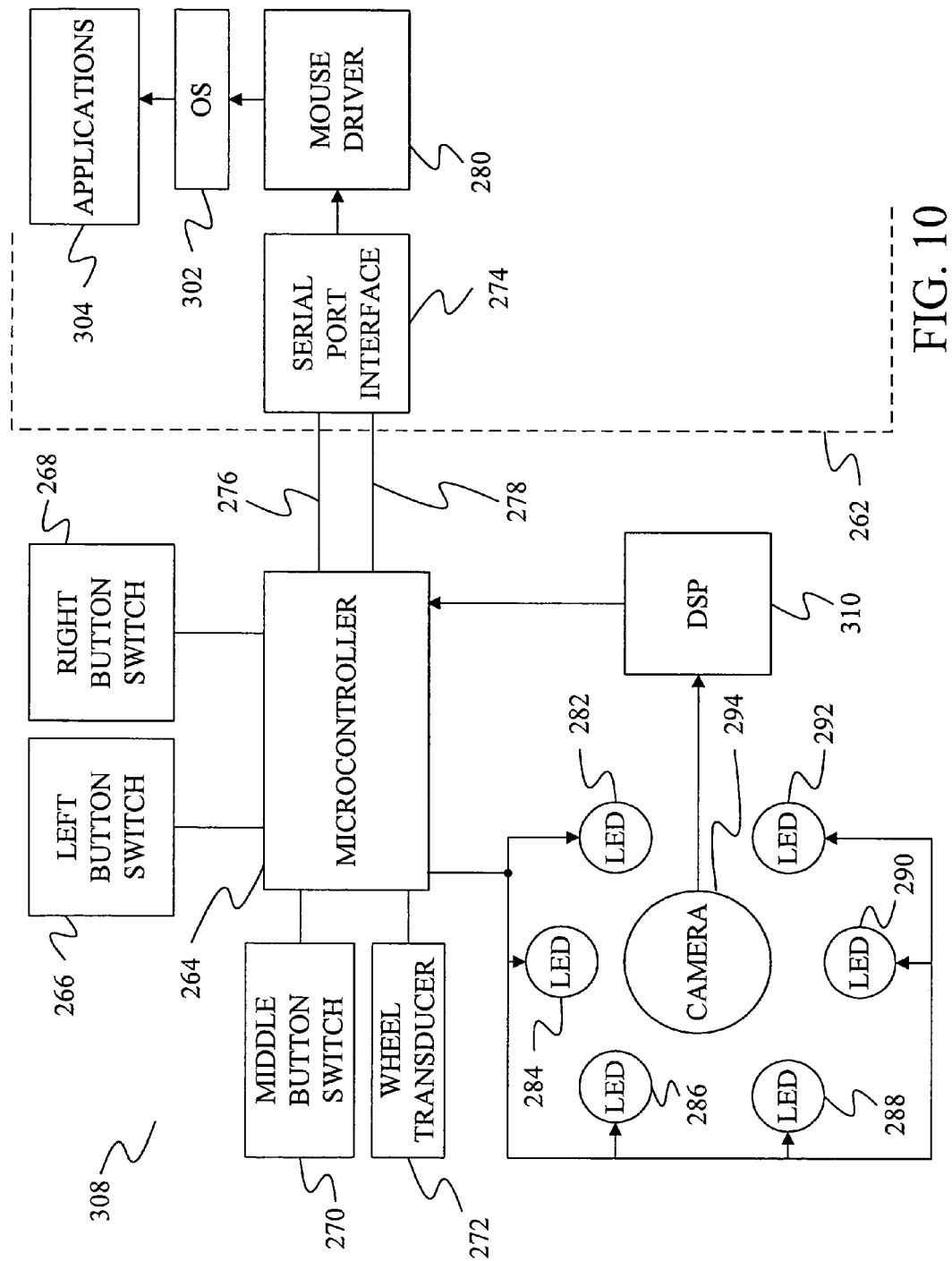
FIG. 10 is a block diagram of a mouse and a computer of an alternative embodiment of the present invention.

FIG. 10 is an alternative block diagram for a mouse 308. Items that perform similar functions to the items shown in FIG. 9 have the same reference number in FIG. 10. In FIG. 10, instead of routing the video signal to a video interface in computer 262, camera 294 routes the video signal to a Digital Signal Processor (DSP) 310 in mouse 308. DSP 310 converts the video signal into position and orientation information using techniques described further below. Although DSP 310 is shown as a single block, those skilled in the art will recognize that its functions may be implemented by using multiple digital signal processors. In particular, DSP 310 may be implemented using two separate digital signal processors. The information generated by DSP 310 is then provided to microcontroller 264, which generates a mouse packet based on this information and the state of the buttons and the wheel on the mouse. The mouse packet is delivered to interface 274, which passes the information to mouse driver 280. Mouse driver 280 uses the information to generate mouse event messages that are routed through Operating System 302 to applications 304.

Six Degrees of Freedom

The structure and processing capabilities of input devices of the present invention allow the devices to be moved along six degrees of freedom and allow this movement to be accurately detected. The processing utilizes a robust real-time tracking algorithm to calculate the device motion and orientation information.

Figure 11:
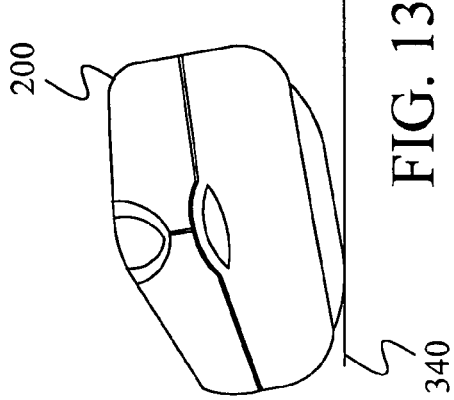
FIGS. 11, 12 and 13 provide selected front views of a mouse of one embodiment of the present invention being tilted to the right.
Figure 12:
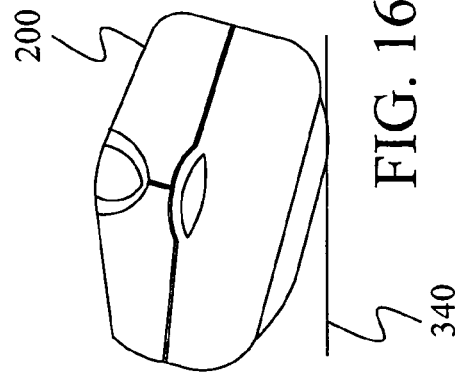
Figure 13:
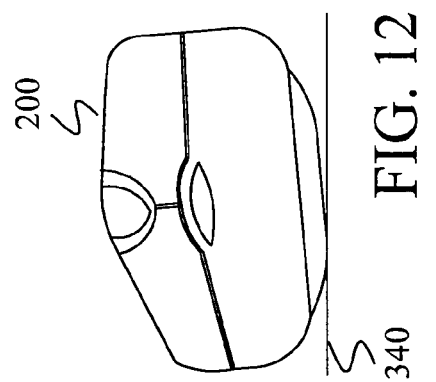
Figure 14:
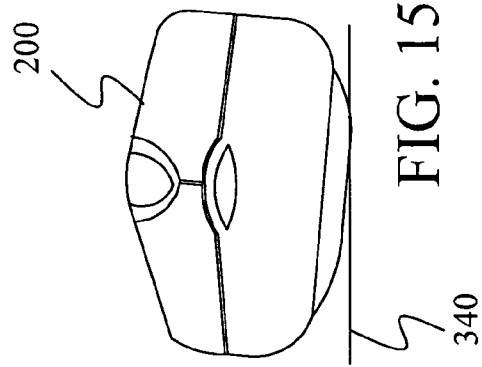
FIGS. 14, 15, and 16 provide selected front views of a mouse of one embodiment of the present invention being tilted to the left.
Figure 15:
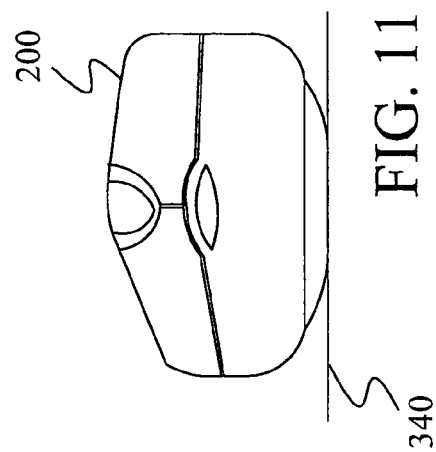
Figure 16:
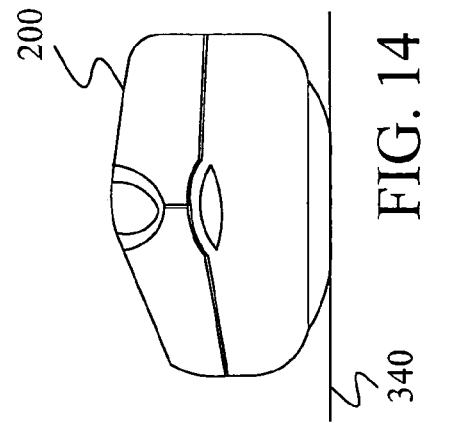

In the embodiment of FIGS. 2-7, one degree of freedom is provided by left and right curved surfaces 212 and 214 (FIGS. 5 and 6), which allow the mouse to be tilted to the left and right. FIGS. 11, 12, and 13 show a sequence of front views of mouse 200 being tilted to the right on a surface 340 and FIGS. 14, 15, and 16 show a sequence of front views of mouse 200 being tilted to the left on surface 340.

Figure 17:
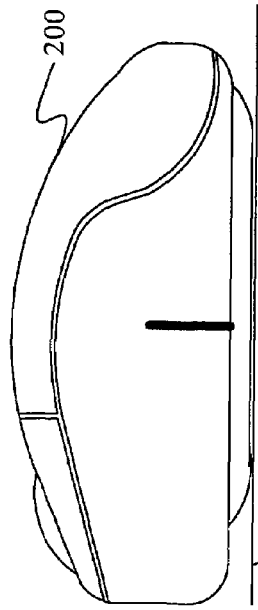
FIGS. 17, 18, and 19 provide selected side views of a mouse of one embodiment of the present invention being tilted forward.
Figure 18:
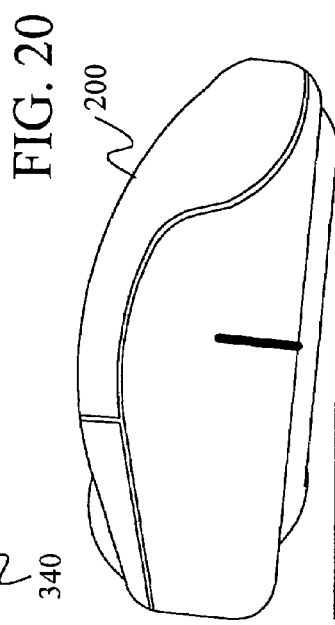
Figure 19:
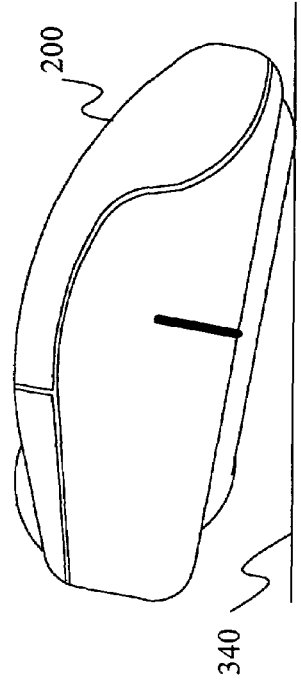
Figure 20:
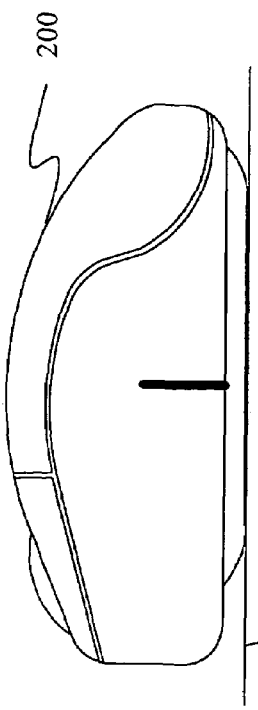
FIGS. 20, 21, and 22 provide selected side views of a mouse of one embodiment of the present invention being tilted back.
Figure 21:
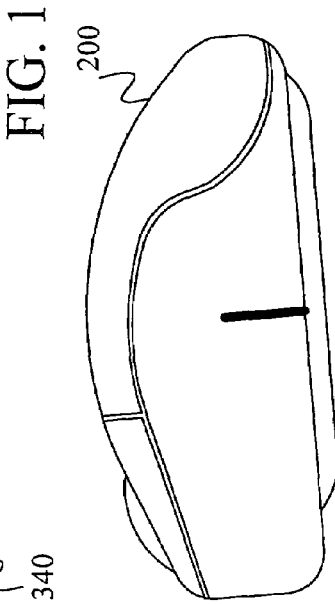
Figure 22:
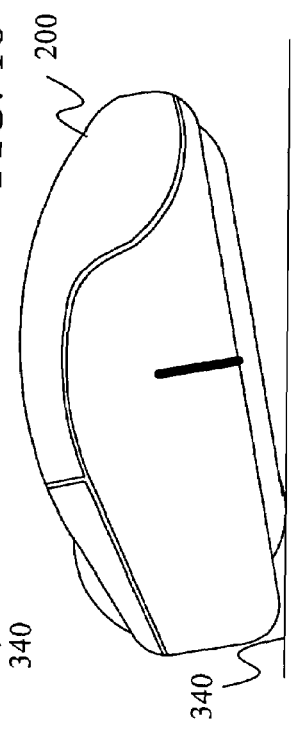

A second degree of freedom is provided by front and back curved surfaces 216 and 218 (FIGS. 3 and 4), which allow the mouse to be tilted forward and back. FIGS. 17, 18, and 19 show mouse 200 being tilted forward on surface 340 and FIGS. 20, 21, and 22 show mouse 200 being tilted backward on surface 340.

Figure 24:
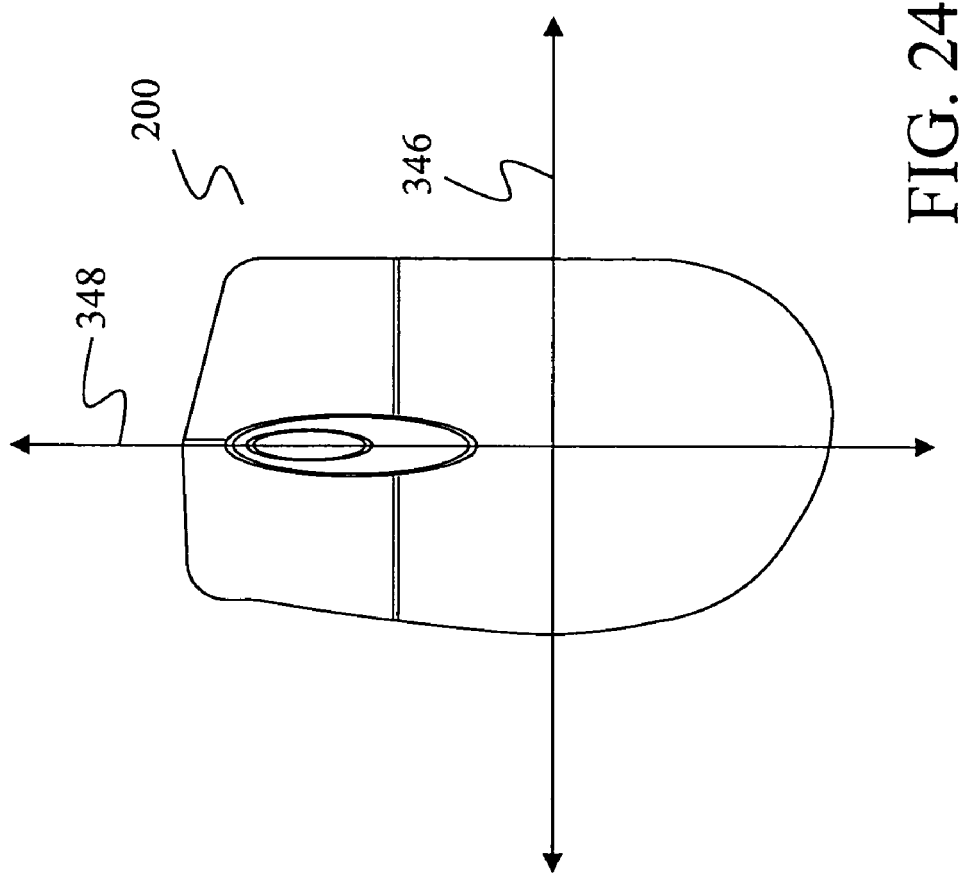
FIG. 24 provides a top view of a mouse of one embodiment of the present invention indicating x-y translation of the mouse.
Figure 23:
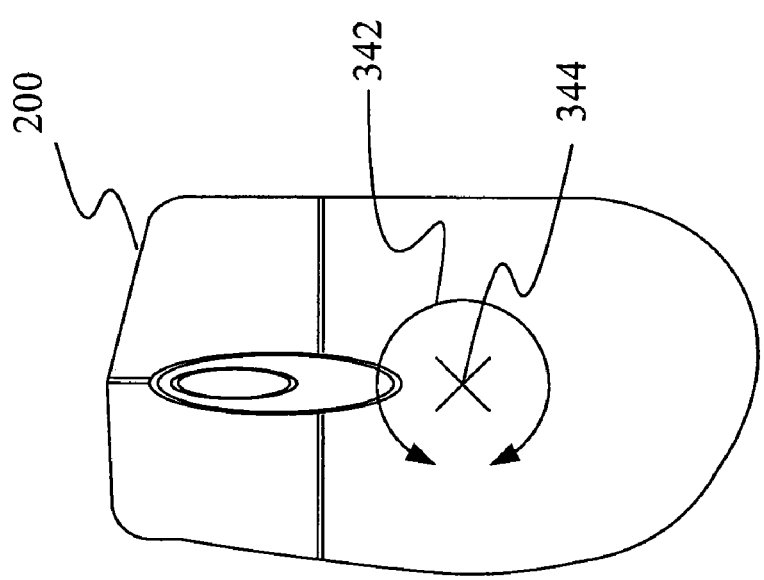
FIG. 23 provides a top view of a mouse of one embodiment of the present invention indicating rotation of the mouse about a vertical axis.

As shown in FIG. 23, mouse 200 provides a third degree of freedom by detecting rotation 342 around a vertical axis 344 (shown as a x in FIG. 23). Mouse 200 provides fourth and fifth degrees of freedom by detecting planar movement of the mouse. This is shown in FIG. 24 as movement of the mouse along x-direction 346 and y-direction 348.

Figure 25:
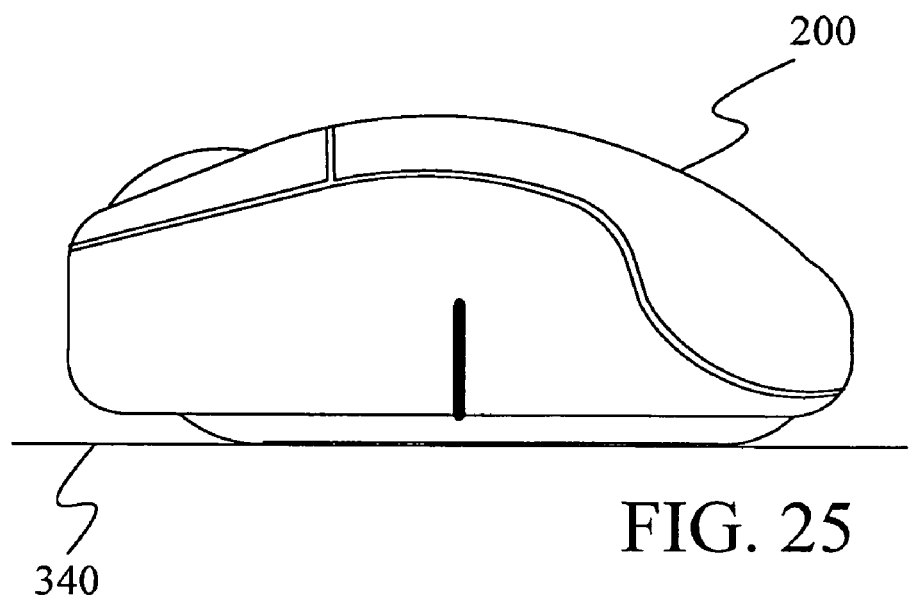
FIGS. 25 and 26 provide selected side views of a mouse of one embodiment of the present invention being lifted off a surface.
Figure 26:
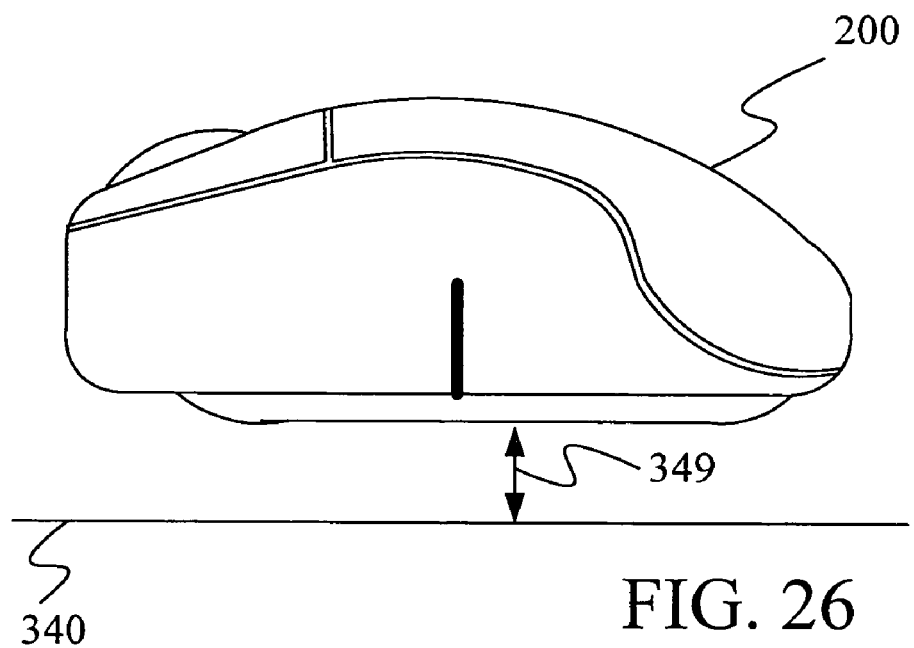

The sixth degree of freedom is the movement of mouse 200 in the vertical direction above a surface. For example, FIGS. 25 and 26 show mouse 200 being lifted above working surface 340 to a height 349.

Determining Position and Orientation

Figure 27:
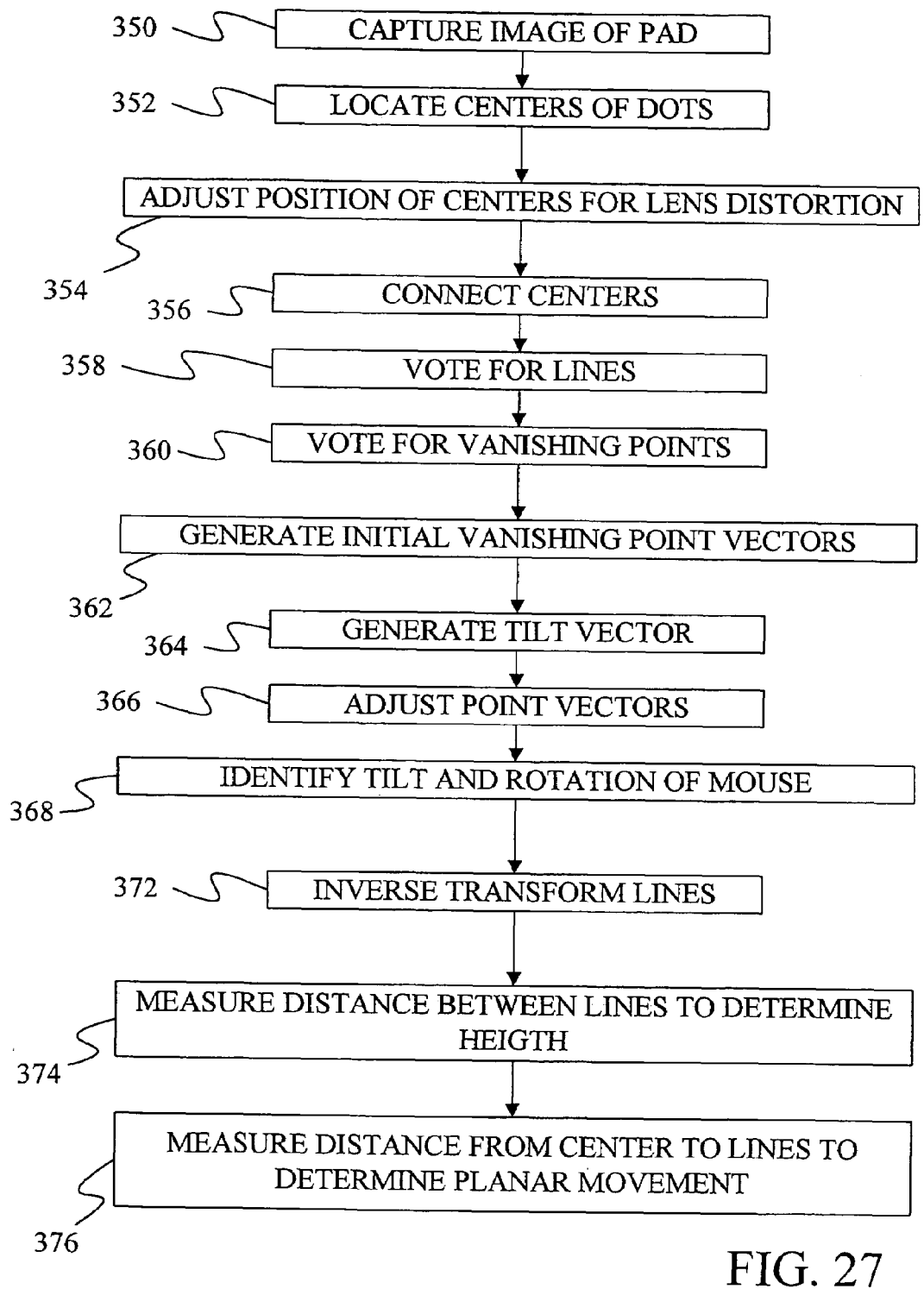
FIG. 27 is a flow diagram for determining the orientation and position of an input device under the present invention.

To determine the position and orientation of the mouse, DSP 310 of FIG. 10 and pose estimator 300 of FIG. 9 use a pose estimation method shown in the flow diagram of FIG. 27. Pose estimation (determining the three-dimensional position and orientation of a camera based on the two-dimensional location of known markers) is a well-studied problem in computer vision. To estimate six degrees of freedom, at least three markers must be found (each marker provides two independent pieces of information). More can be used for redundancy.

Figure 28:
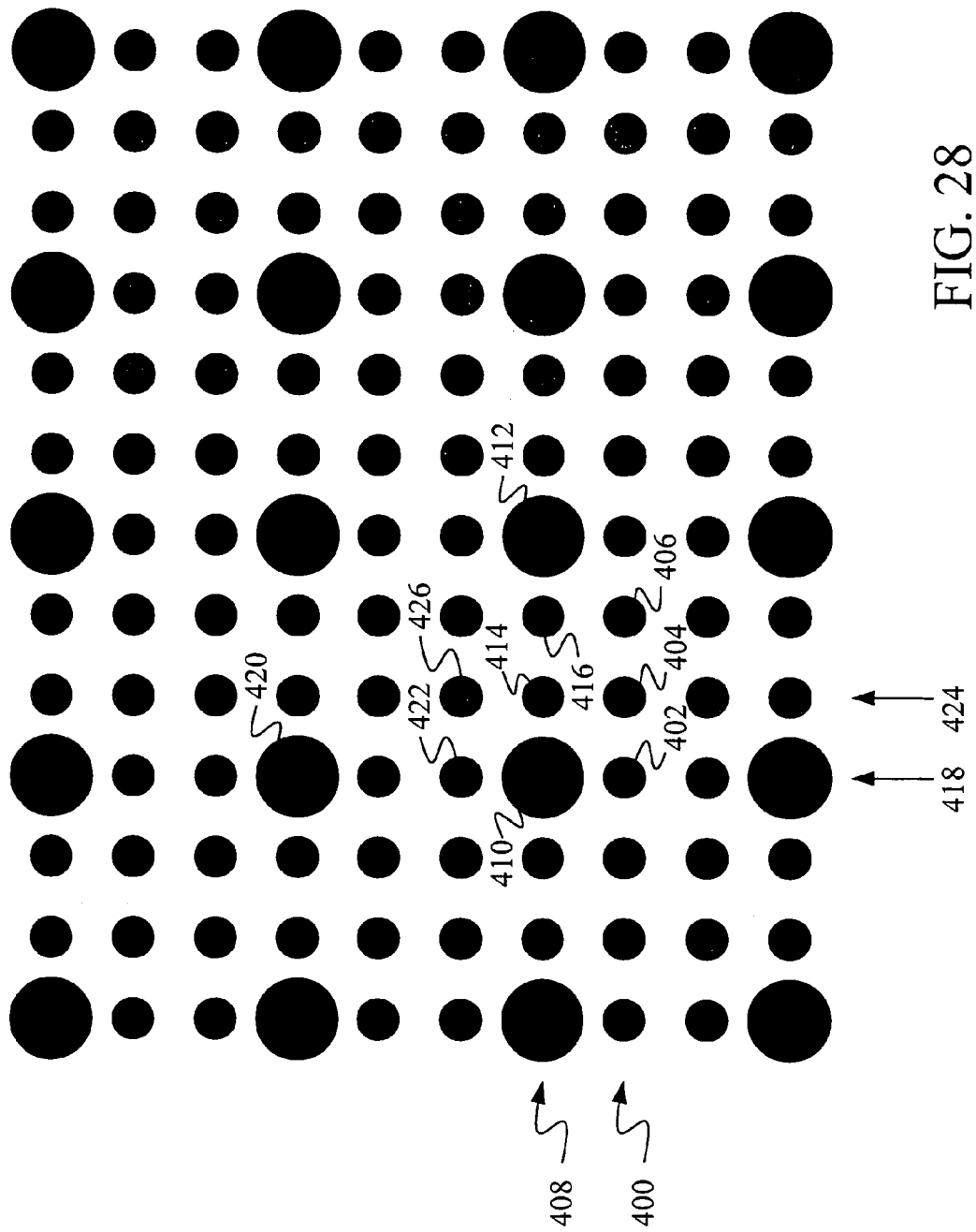
FIG. 28 is a top view of a pad under one embodiment of the present invention.

The markers needed to identify the orientation of the input device are provided by a patterned pad that the input device moves across. In one embodiment, the pattern on the pad consists of a grid of black dots as shown in FIG. 28. The grid pattern of FIG. 28 includes rows and columns of large and small dots. For example, row 400 contains small dots 402, 404, and 406 while row 408 contains large dots 410 and 412 and small dots 414 and 416. Similarly, column 418 contains large dots 410 and 420 and small dots 402 and 422, while column 424 contains small dots 404, 414, and 426. Note that in the embodiment of FIG. 28 the rows and columns are at right angles to each other.

Although the grid pattern of FIG. 28 is used in the description below, those skilled in the art will recognize that any other known patterns for determining position and orientation information for a camera may be used to determine the position and orientation of the mouse. In particular, a checkerboard pattern or sinusoidal pattern can be used.

Figure 29:
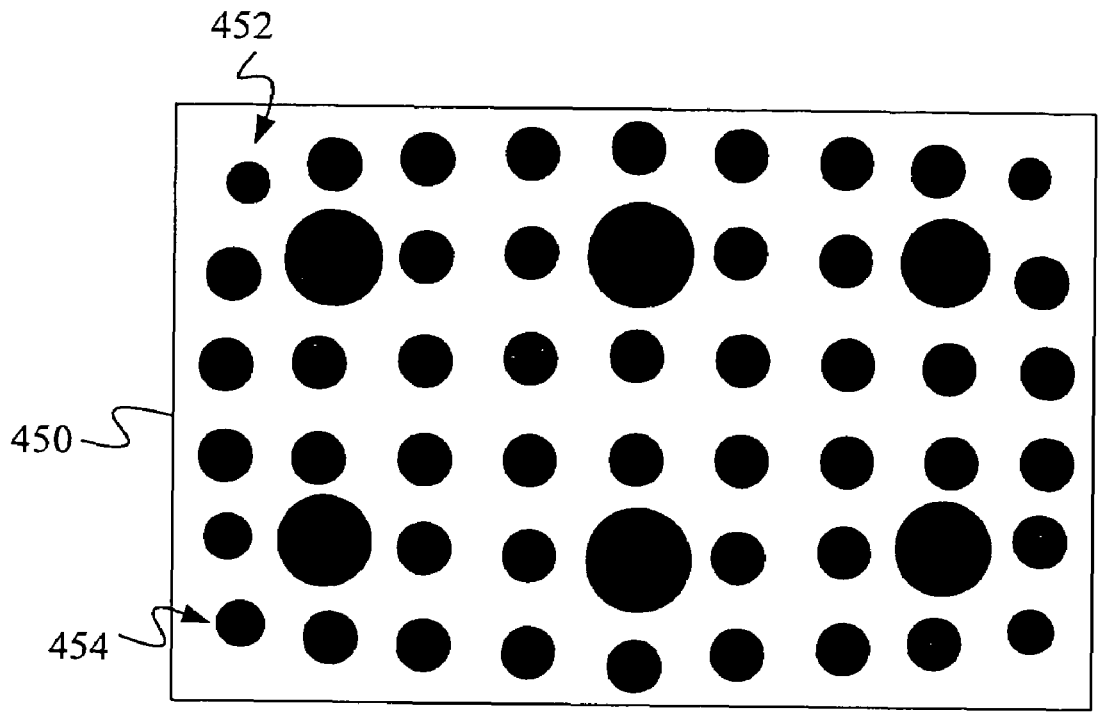
FIG. 29 is a captured image of a portion of a pad.

At step 350 of FIG. 27, an image of the grid pattern under the mouse is captured. An example of such a captured image is shown in FIG. 29 as image 450. In image 450, the rows and columns of dots are curved because of distortions introduced by the lens of the camera. This curving is more apparent at the edges of the image than at the center. For example, column 452 and row 454 at the edges of image 450 are significantly curved.

Figure 30:
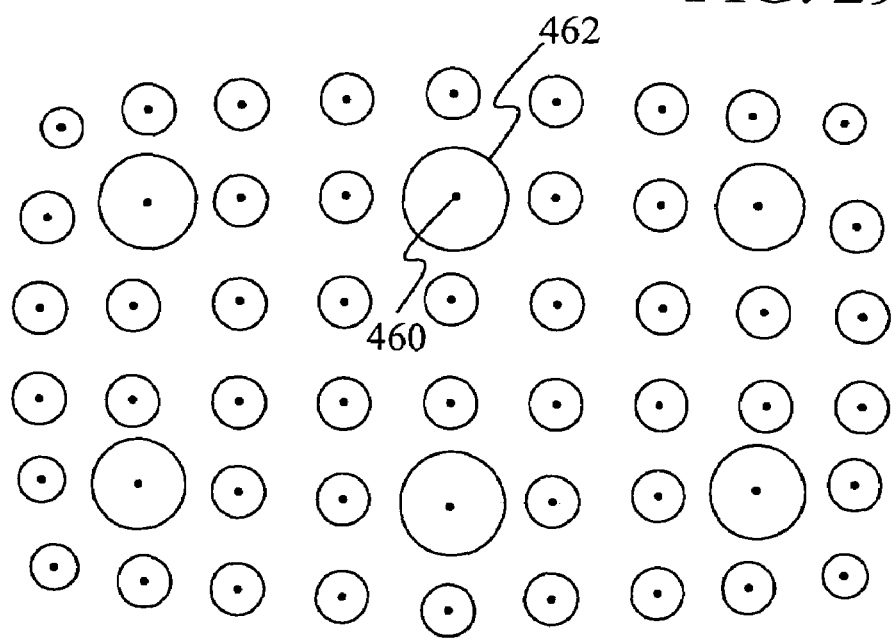
FIG. 30 shows the location of dot centers in marker dots.

The amount of distortion applied to a dot is a function of the dot's position within the lens. As such, the lens distortion can be removed using a set of fixed compensation functions. To remove this distortion, the center of each dot is first determined at step 252 of FIG. 27. The centers of the dots are shown in FIG. 30, where the color of the dots has been changed to white so that the centers can be shown clearly by a small black mark within the white dots. For example, black mark 460 indicates the center of dot 462 in FIG. 30.

Figure 31:
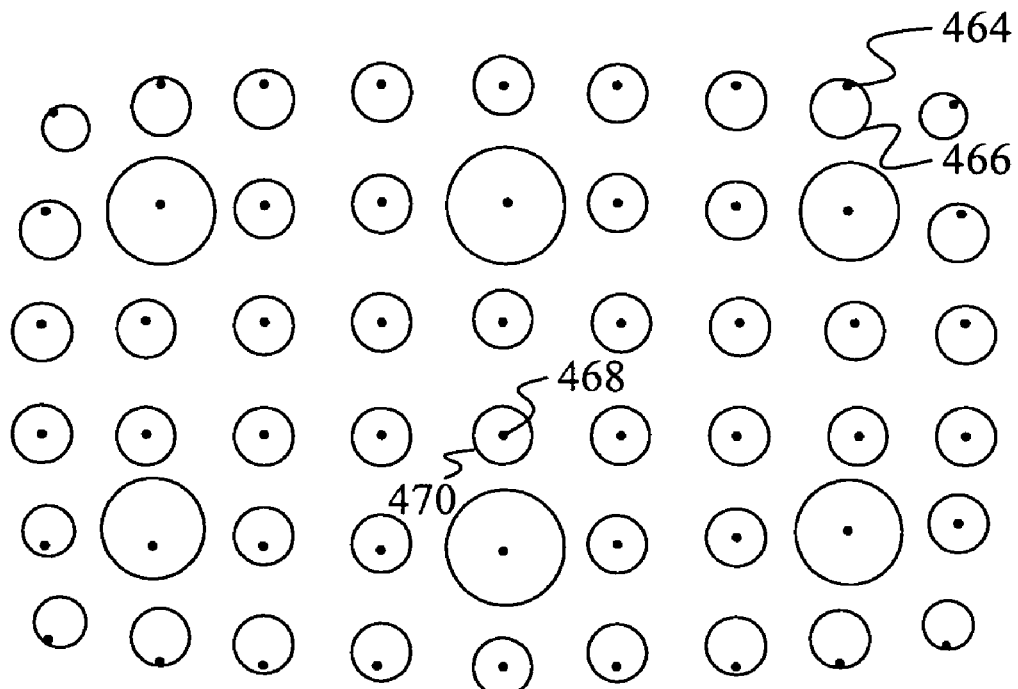
FIG. 31 shows the location of dot centers that have been adjusted for lens distortion.

Once the dot centers have been computed, the locations of the dot centers are adjusted at step 354 of FIG. 27 to compensate for lens distortion. Under one embodiment, the lens distortion parameters are estimated using a plumb line method known to those skilled in the art. The results of such compensation are shown in FIG. 31. For example, center 464 of dot 466 has been moved so that it is now in the upper right side of the dot. Note that dots in the center of the image have their respective centers moved only small distances or not at all. For example, center 468 of dot 470 is not moved much by the lens distortion compensation.

Figure 32:
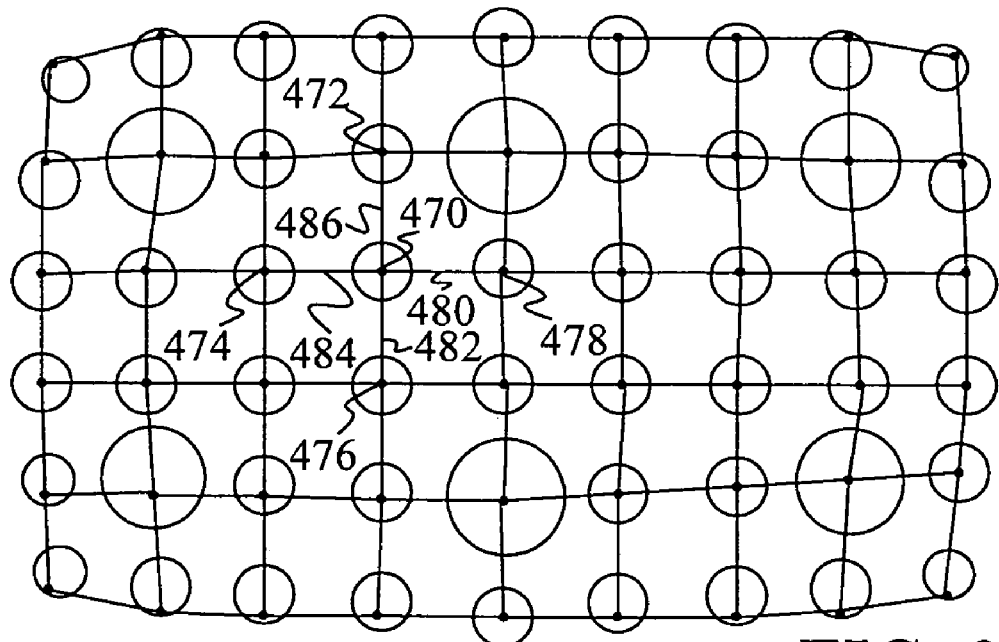
FIG. 32 shows the construction of edgels between dot centers.

After compensating for the lens distortion, the adjusted centers of the dots are connected together at step 356 of FIG. 27. Specifically, each dot's center is connected to its four nearest neighbors. The results of this are shown in FIG. 32 where dot centers such as center 470 are connected to their four nearest neighbors, such as centers 472, 474, 476 and 478. The line segments, such as segments 480, 482, 484, and 486 are often referred to as edgels.

Figure 33:
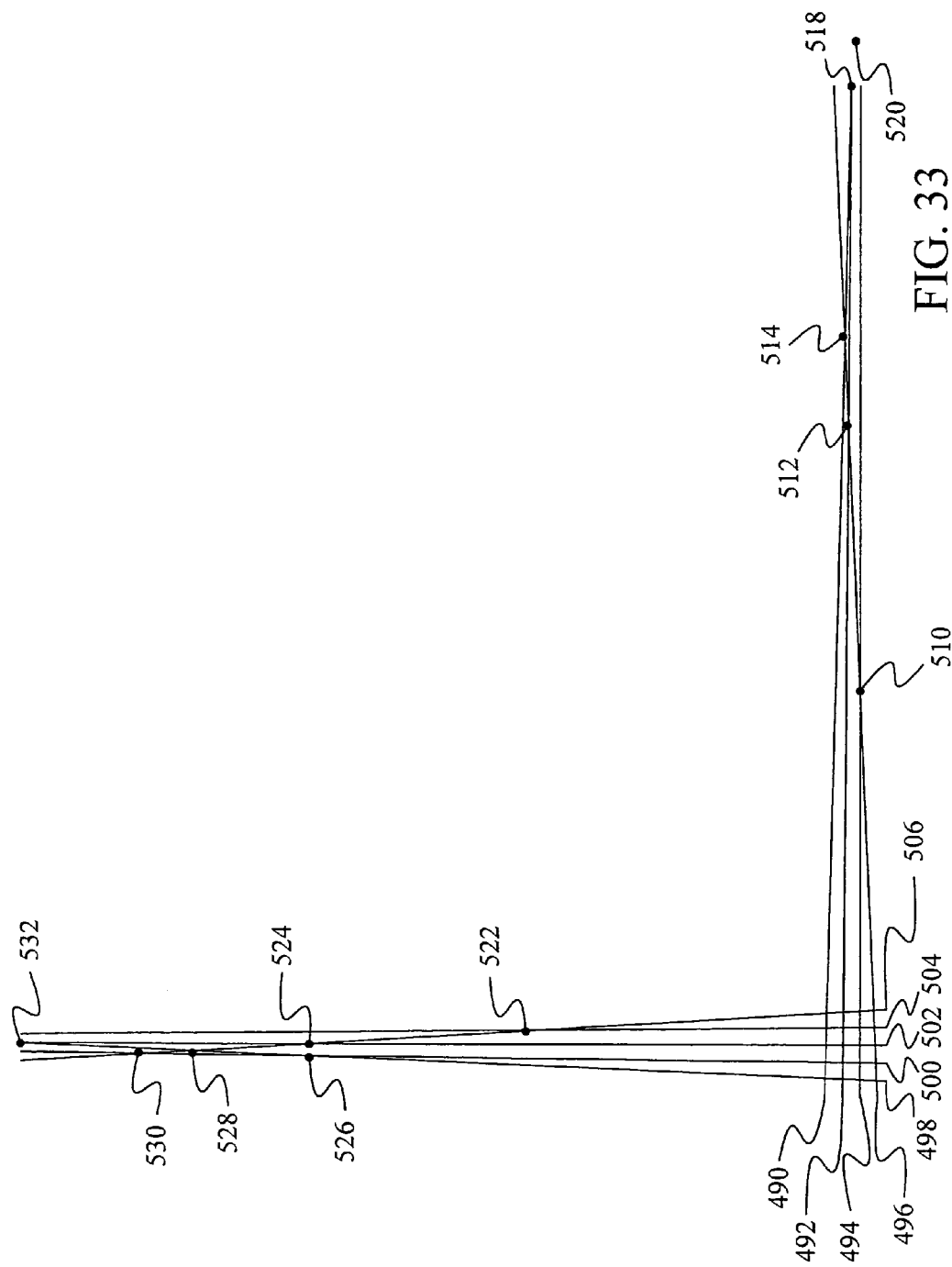
FIG. 33 shows straight lines and vanishing points constructed from the edgels.

The line segments or edgels are then used to extract lines for the grid. Under one embodiment, a Hough transform is used to vote for lines through the edgels. This is shown as step 358 in FIG. 27. The results of this voting is a set of straight lines, such as lines 490, 492, 494, 496, 498, 500, 502, 504, and 506 of FIG. 33.

Figure 34:
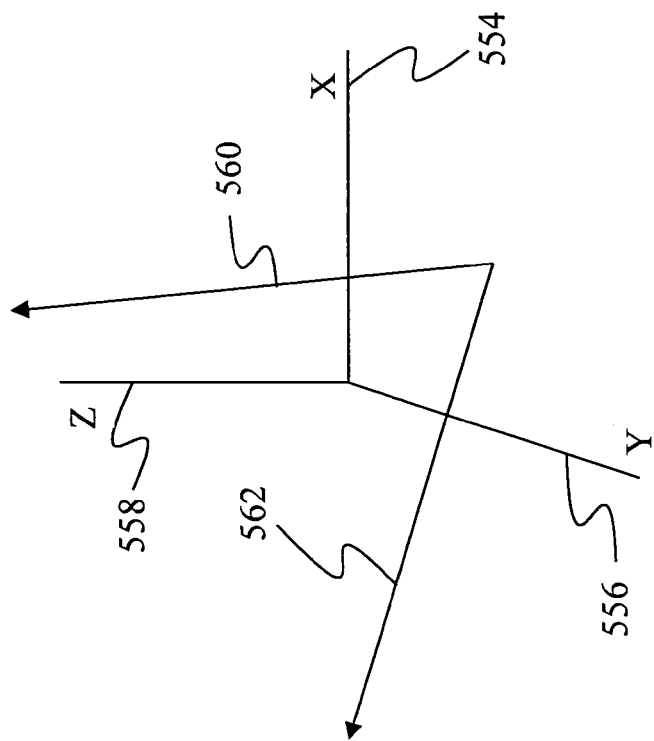
FIG. 34 shows two vanishing point vectors.

Once the lines have been constructed, vanishing points are extracted at step 360. Under one embodiment, a generalized Hough transform is used to vote for vanishing points associated with pairs of nearby lines. Examples of such vanishing point estimates are shown as points 510, 512, 514, 518, 520 522, 524, 526, 528, 530, and 532 in FIG. 33. Then the original lines are used to refine the vanishing point estimates by minimizing $\Sigma_i(l_i^T v)^2$, where $l_i$ is the line equation in homogeneous coordinates, and v is the vanishing point in homogeneous coordinates. This can be found as the minimum eigenvector of the symmetric 3×3 matrix $\Sigma_i(l_i l_i^T)$. The best vanishing point estimate is then selected to generate an initial vanishing point vector that extends from the center of the image to the selected vanishing point. A next best vanishing point vector is then selected that is separated from the first vanishing point vector by some minimum angle. The corresponding line equations based on the two selected vanishing points are then selected as the actual grid lines. This is shown as step 362 in FIG. 27. Examples of such vectors are shown as vanishing point vectors 560 and 562 in FIG. 34, which also shows an x-axis 554, a y-axis 556, and a z-axis 558 for spatial reference. In FIG. 34, vector 560 extends above x-axis 554 and vector 562 extends above y-axis 556.

Techniques for using vanishing point vectors to determine the orientation of a camera are discussed in detail in "Using Vanishing Points for Camera Calibration", Caprile, B. and Torre, V., International Journal of Computer Vision, Volume 4, No. 2, March 1990, pp. 127-139, which is hereby incorporated by reference. A summary of this technique is provided below.

The vanishing point vectors determined above are transformed into three dimensions by adding the focal length of the camera as the third dimension of each vector. The focal length is generally determined during production of the input device using techniques known in the art. The vanishing point vectors and their negatives (vectors pointing in the opposite direction) are then compared to an "up" vector that designates where the top of the pad is located. A pad that encodes the "up" direction is discussed further below. When such a pad is not being used, the "up" direction must be predicted from its previous location. The vanishing point vector or negative that is closest to the "up" vector is then selected as an initial axis for the grid. The vanishing point vector or negative that forms a positive z cross-product with the initial axis is then selected as the second initial axis for the grid.

Figure 35:
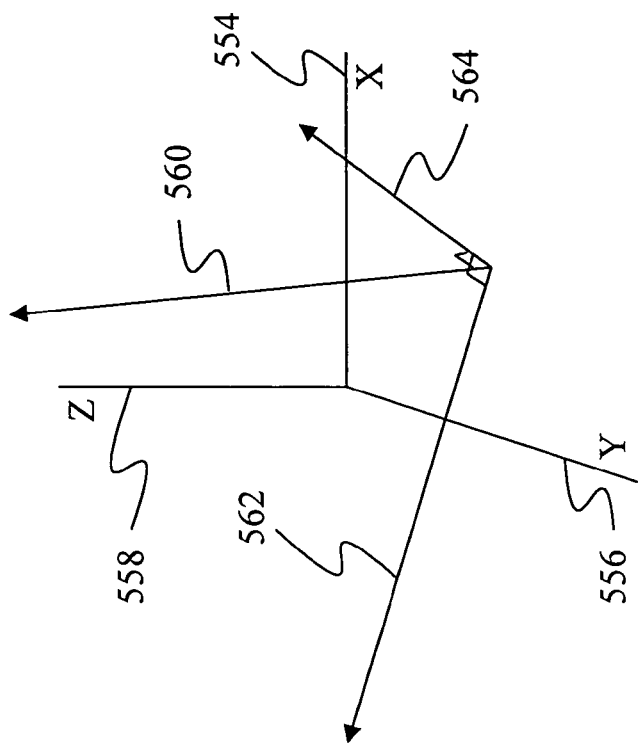
FIG. 35 shows two vanishing point vectors and a tilt vector.

After the initial axes have been determined, a tilt vector is determined at step 364 of FIG. 27. The tilt vector indicates the left-right and front-back tilt of the mouse. If the tilt vector is completely vertical, the mouse is flat on the working surface. Otherwise, the mouse is tilted. To compute the tilt vector, the cross-product of the initial axes is taken. This produces a vector that is orthogonal to the plane containing the two initial axes. An example of such a tilt vector is shown as tilt vector 564 in FIG. 35.

Once the tilt vector has been generated, the initial axes are adjusted at step 366. This adjustment reduces errors in the initial axes that were introduced during the vanishing point selection process. The basic theory of the adjustment is that the axes should be perpendicular to each other within their common plane since the grid contains perpendicular rows and columns. To the extent the axes are not orthogonal to each other, they are in error.

Figure 37:
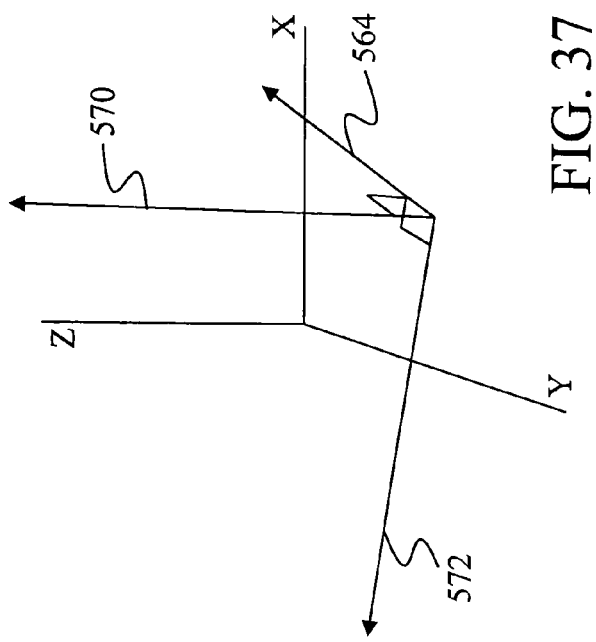
FIG. 37 shows two adjusted vanishing point vectors and a tilt vector.
Figure 36:
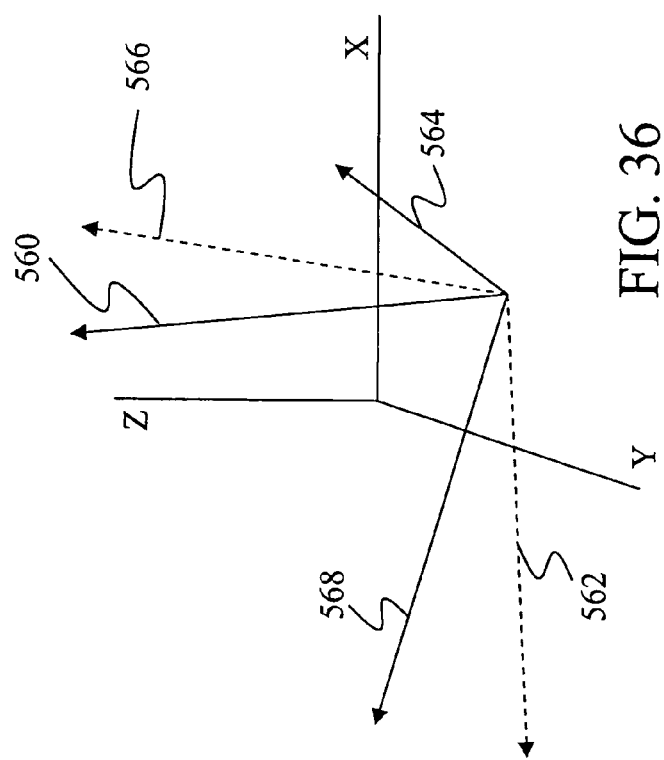
FIG. 36 shows two hypothetical vectors.

To reduce this error, the adjustment process determines two hypothetical axes, each perpendicular to one of the calculated initial axes. The hypothetical axes are easily generated by determining the cross-product of a corresponding calculated axes and the tilt vector. Thus, in FIG. 36, the cross-product of axis 562 and tilt vector 564 generates hypothetical axis 566 and the cross-product of axis 560 and tilt vector 564 generates hypothetical axis 568. A weighted average of each hypothetical axis and its nearest initial axis is calculated to generate the adjusted axes. In one embodiment, the weights for the weighted average are based on the weights generated during the Hough voting used to find the vanishing points. The results of this adjustment are shown in FIG. 37 as adjusted axes 570 and 572 and tilt vector 564.

After the axes have been adjusted at step 366, a rotation matrix is generated that describes the rotation and tilt of the mouse at step 368 of FIG. 27. The rotation matrix has the form:

$$[x\ y\ z] \times \begin{bmatrix} r_{11} & r_{21} & r_{31} \\ r_{12} & r_{22} & r_{32} \\ r_{13} & r_{23} & r_{33} \end{bmatrix} = [x'\ y'\ z'] \quad \text{EQ. 1}$$

where x, y, z represent the coordinates in the projection space of the camera and x', y', and z' represent the coordinates along the grid. To generate the first two rows of the matrix, the equations describing the adjusted axes are normalized by dividing each axis vector by its length. The first row of the rotation matrix receives the normalized axis that describes the x' axis of the grid and the second row of the rotation matrix receives the normalized axis that describes the y' axis of the grid. The third row of the rotation matrix is formed by taking the cross-product of the first two rows.

The rotation of the mouse is then determined by moving the z-axis of the mouse along the common plane between the z-axis of the mouse and the tilt vector so that the z-axis and tilt vector are aligned. The angle between the y-axis of the mouse and the y'-axis of the grid is then measured. The angular difference 580 between these two vectors represents the rotation of the mouse relative to a column of dots on the pad.

Under some embodiments, the absolute rotation of the mouse relative to the pad is calculated based on the latest rotation measurement, a previously calculated rotation for the mouse and a calculated rate of rotation. Based on this information, it is possible to determine the most likely orientation of the pad relative to the front of the mouse. Specifically, it is possible to determine what direction the vanishing point vector points to on the pad.

Figure 39:
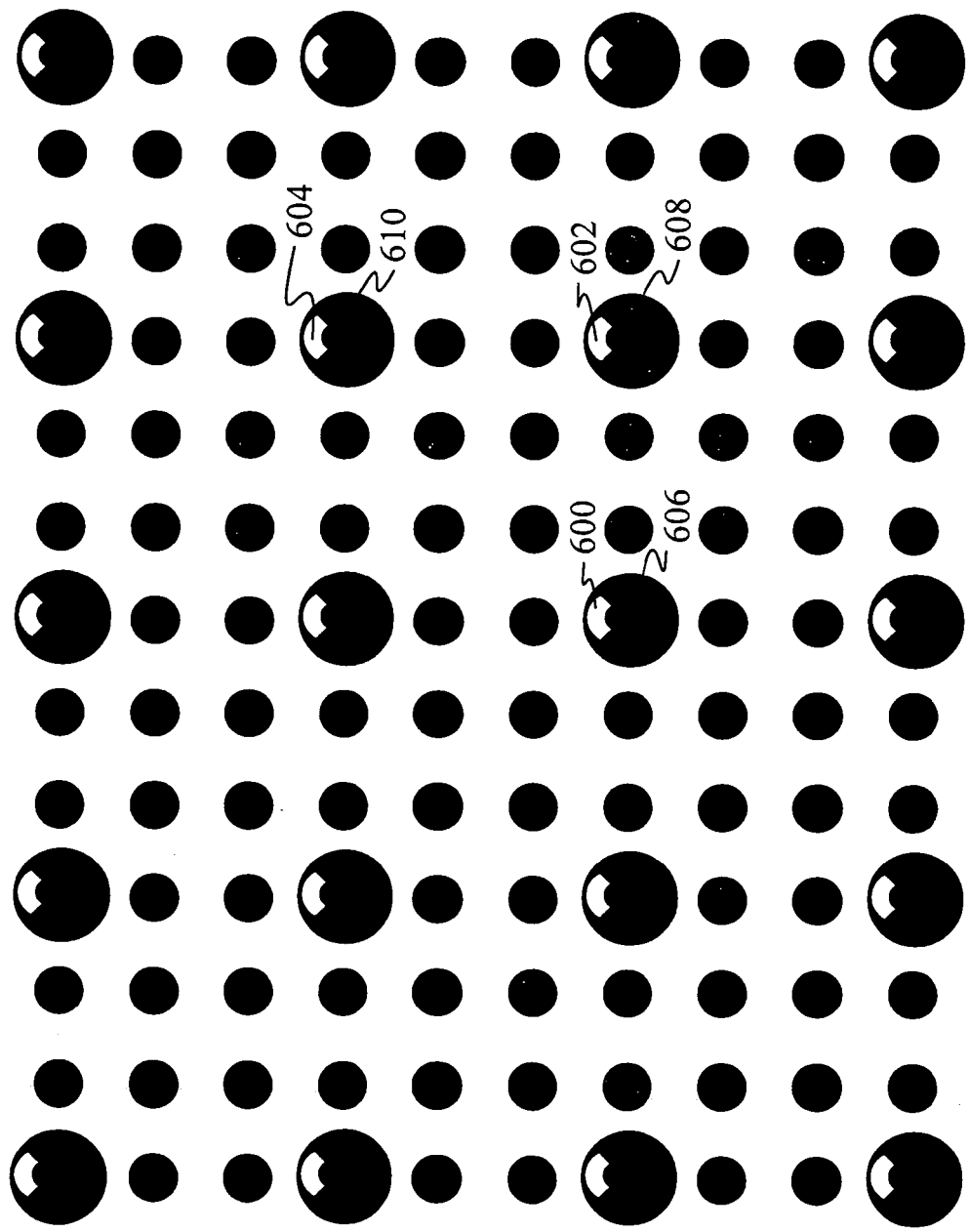
FIG. 39 shows a pad layout for an alternative embodiment of the present invention.

To reduce the complexity of the absolute rotational computation, some embodiments of the invention utilize a pad with an orientation mark in some of the dots that indicates where the top of the pad is located. An example of such a pad is shown in FIG. 39 where orientation marks 600, 602, and 604 have been added to large dots 606, 608, and 610 to indicate the location of the top of the mouse pad. By detecting where the top of the pad is, it is possible to select the pad axis vector that points to the top or bottom of the pad when determining the rotation of the mouse.

Figure 40:
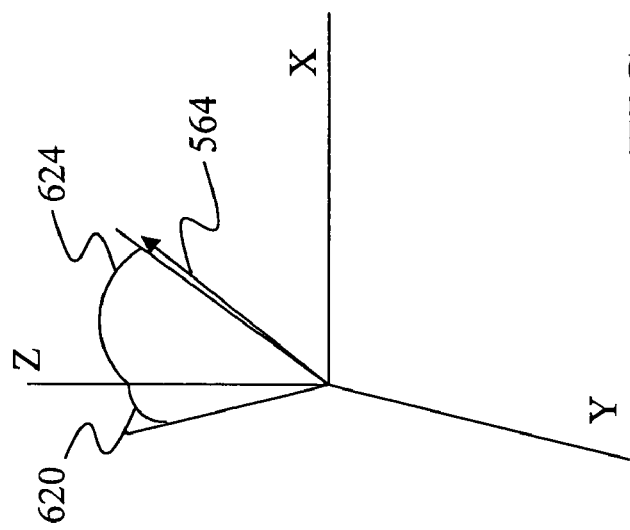
FIG. 40 shows tilt angles relative to a tilt vector.
Figure 38:
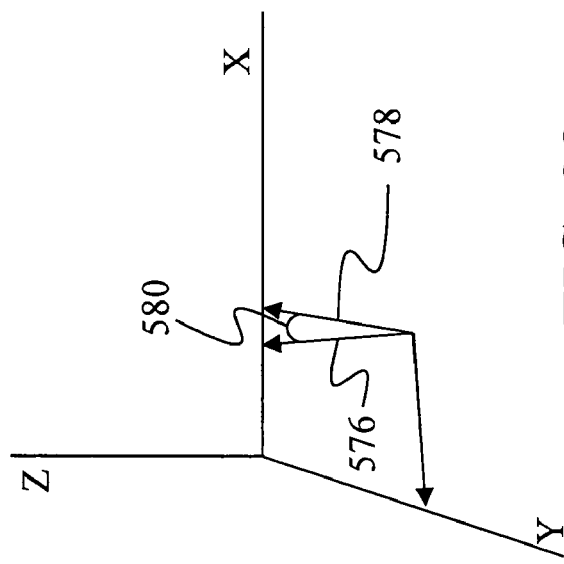
FIG. 38 shows an angle of rotation.

Once the rotation of the mouse has been determined, the tilt of the input device can be determined by examining the tilt vector relative to the input device's x, y, z projection space. Specifically, the angles between the tilt vector and the x=0 plane and the y=0 plane are determined. This determination is shown in FIG. 40 where angle 620 between tilt vector 564 and the y=0 plane provides the forward-backward tilt of the mouse and angle 624 between tilt vector 564 and the x=0 plane provides the left-right tilt of the mouse. Note that in FIG. 40, angle 620 is shown between the z-axis and a projection of the tilt vector on the x=0 plane for clarity. Similarly, angle 624 is shown between the z-axis and a projection of the tilt vector on the y=0 plane.

Once the tilt and rotation of the mouse have been determined at step 368, the process of FIG. 27 continues at step 372 where the line equations determined at step 358 are inverse transformed using an inverse rotation matrix. The inverse rotation matrix is the inverse of the rotation matrix described above in Equation 1. The line equations are also multiplied by a lens transform that transforms the lines so that they do not converge at the vanishing point. This transform is a function of the focal length of the lens, the length of the vanishing point vector, and the intersection point of the lines at the x, y axes of the camera. The results of these transforms produce a canonical grid of horizontal and vertical lines in the projected plane of the camera.

Once the grid has been transformed, the distance between adjacent lines is measured at step 374 of FIG. 27. Specifically, the x-coordinates of the centers of the vertical lines and the y-coordinates of the centers of the horizontal lines are used to find the median spacing between grid lines. The median spacing between grid lines calculated above is compared with the median spacing found when the mouse is at rest to find a tilt-compensated distance to the mouse pad when the mouse is in its current position.

Figure 41:
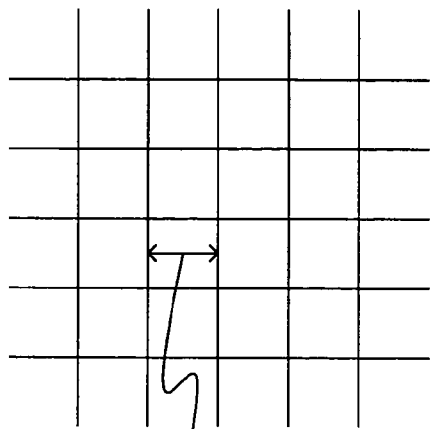
FIGS. 41 and 42 show the affect on grid line spacing caused by changes in the height of the input device.
Figure 42:
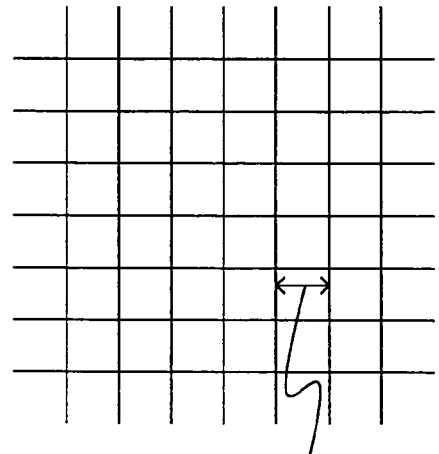

The relationship between the line spacing and the height of the mouse is shown in FIGS. 41 and 42. FIG. 41 provides an image of the grid when the mouse is at rest and FIG. 42 provides an image of the grid when the mouse is some height above the pad. Note that as the mouse is raised, the spacing between the grid lines decreases. Thus, spacing 650 of FIG. 41 is greater than spacing 652 of FIG. 42.

Note that the tilt compensated distance calculated above does not reflect the true height of the mouse over the pad because the spacing estimate is performed on a grid that has been inverse transformed to remove the effects of tilting. Since tilting can cause a uniform change in the height of the mouse over the pad, the tilt compensated distance must be multiplied by the component of the rotational matrix that represents that change in order to determine the actual height of the mouse over the pad. Specifically, the tilt compensated distance is multiplied by the $r_{33}$ component of the rotation matrix of Equation 1 to form the actual height of the mouse over the surface.

Figure 43:
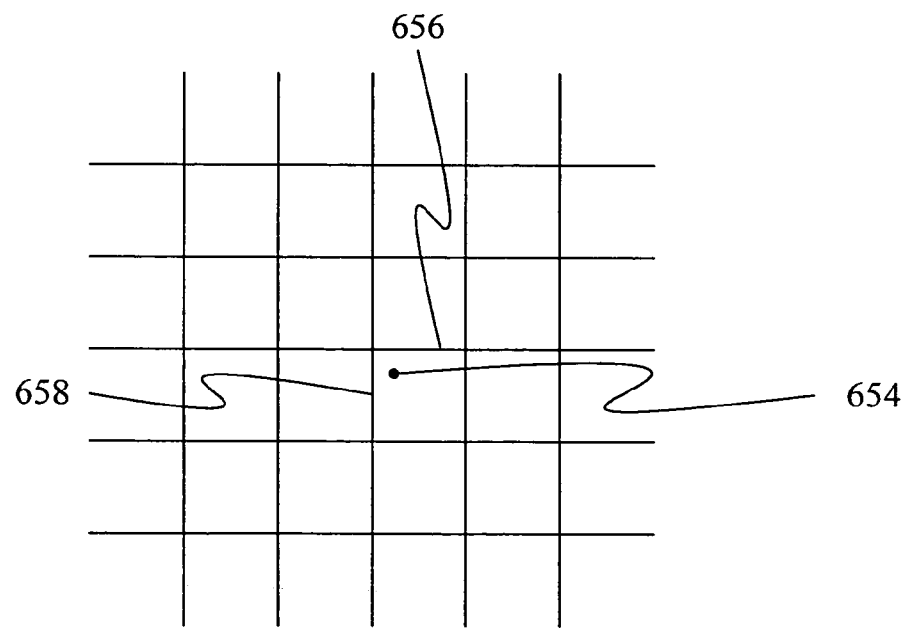
FIG. 43 shows the location of an image center relative to grid lines for determining the horizontal and vertical phase of the grid.

After the height has been determined, the process of determining the orientation and location of the mouse continues at step 376 of FIG. 27. In step 376, the horizontal and vertical lines closest to the center of the image are used to find the phase of the grid relative to the center using the median spacing as a frequency. One phase is determined relative to the horizontal line and one phase is determined relative to the vertical line. For example, FIG. 43 shows a center 654, which is closest to horizontal line 656 and vertical line 658. Thus, the horizontal phase value is calculated as a ratio of the distance from center 654 to vertical line 658 over the median spacing while the vertical phase value is calculated as a ratio of the distance from center 654 to horizontal line 656 over the median spacing. These phase values are then used to determine the x-y change in position of the mouse relative to the pad.

To reduce the complexity of calculating the absolute position of the mouse on the pad, one embodiment of the invention uses a pad similar to the pad of FIG. 39 in which white mini-dots (holes) are placed inside selected (enlarged) black dots (marker dots) to enable phase computation (2-D motion) over a wider range. After grid lines have been found, lines containing marker dots are identified and the phases of these lines are used to get a position estimate that allows faster mouse motion. For example, given a sampling rate of 30 Hz, a grid with dots spaced 0.1" apart and marker dots in every third row and column is theoretically limited to motions slower than 4.5 in/s.

By placing the holes slightly higher than the centers of the marker dots as shown in FIG. 39, an estimate of the "up" direction is computed when the dots are found. This "up" direction is used to make sure that the x-axis and y-axis are oriented correctly when the rotation matrix is computed.

Figure 44:
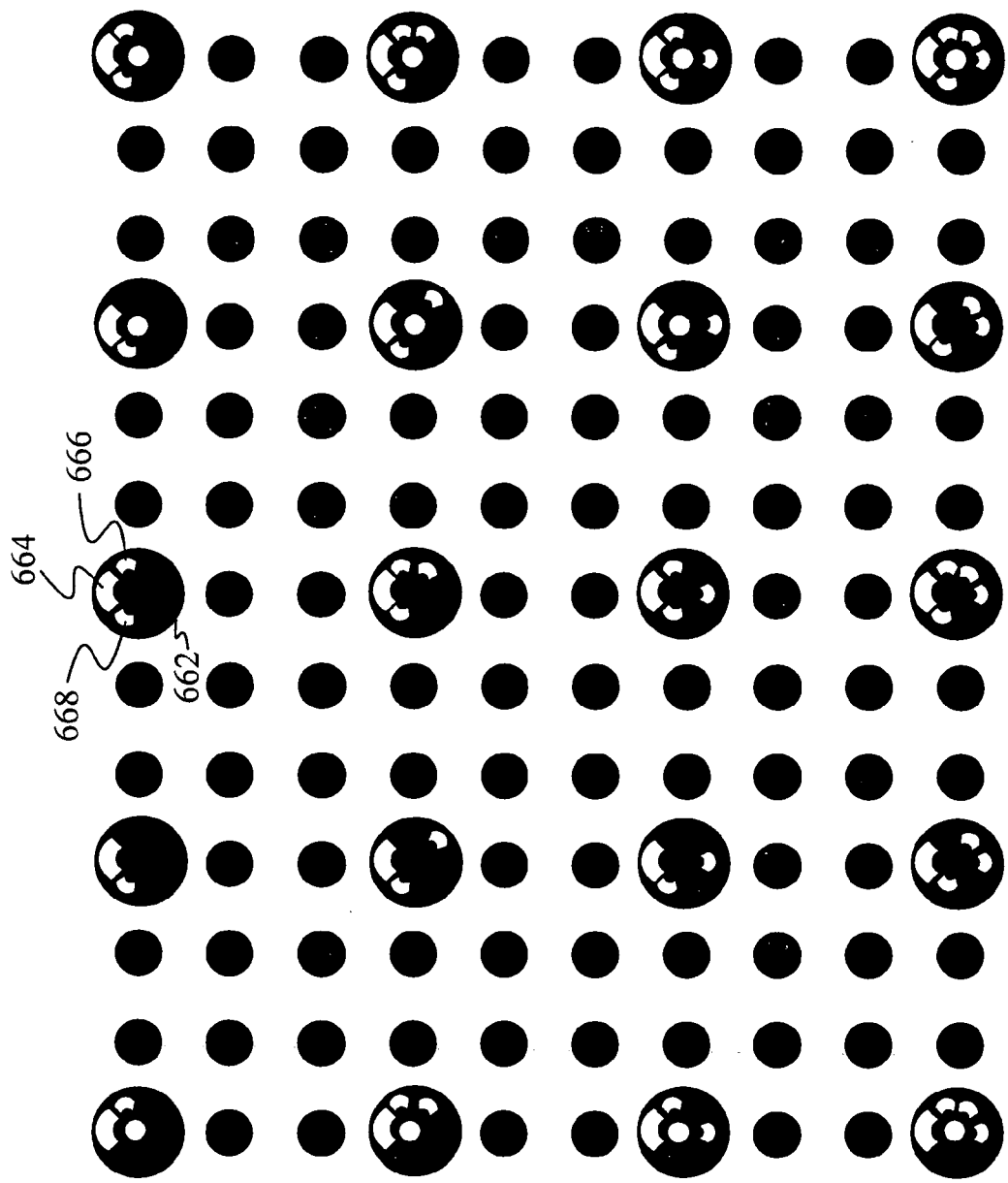
FIG. 44 shows a pad layout for an alternative embodiment of the present invention.

In other embodiments, additional holes are added to the marker dots to encode 3-bit row and column coordinates. When large dots with holes are found, the largest hole is used to encode orientation information. The other holes can fall in six possible locations relative to the centroids of the dot and the largest hole. An example of a pad with such a configuration is shown in FIG. 44, where marker dot 662 is an exemplary marker dot. In FIG. 44, marker dot 662 contains a large hole 664 used to indicate the "up" direction on the mouse pad, and two location holes 666 and 668 that encode the location of marker dot 662 on the pad. The presence or absence of a hole encodes one bit of row or column position information.

Under most embodiments, the cursor motion as one translates the mouse corresponds to the user's hand motion regardless of the mouse pad orientation. The techniques under these embodiments use the absolute rotation of the mouse pad relative to the mouse to counter-rotate the (x, y) translational motion samples, so that cursor motion always corresponds to hand motion in an intuitive manner, even when the mouse pad is upside down, for example. Thus, if the mouse is rotated 90° clockwise on the mouse pad, and the user slides the mouse toward the top of the pad, the sliding motion is counter rotated 90° counterclockwise so that it is reported as a sliding motion to the left.

Thus, input devices of such embodiments are able to detect the absolute orientation of the device on the pad while at the same time providing x and y movement information relative to some part of the input device and not some point on the pad. For example, if the user moves the mouse left-to-right relative to a point on the mouse but front-to-back relative to the top of the pad, a cursor on the display will move right and not down.

In other embodiments, the x-y translation of the mouse is determined by cross-correlating a small sample area from the previous image with the entire image area of a current image. Cross correlation between the pattern in the sample area and the pattern for the entire image area of the current image is defined as follows:

$$R(x, y) = \int_{\frac{L_P}{2}}^{\frac{L_P}{2}} \int_{\frac{L_P}{2}}^{\frac{L_P}{2}} P(i, j)Q(i-x, j-y)di\,dj \qquad \text{EQ. 2}$$

where:

$L_P$ is the length of the sample image area;

(i,j) is position data on the sample image area;

P(i,j) is a function which indicates light intensity and which corresponds to the pattern or image detected;

Q(i,j) is a function indicative of light intensity over the entire image area; and R(x,y) is the correlation of P and Q.

Equation 2 can be written in the following summation form since the image pattern is received by an array of individual cells:

$$R(x, y) = k \sum_{i=-\frac{L_P}{2}}^{\frac{L_P}{2}} \sum_{j=-\frac{L_P}{2}}^{\frac{L_P}{2}} \{P(i, j)Q(i-x, j-y)\} \qquad \text{EQ. 3}$$

$$R(x, y) = K \sum_{i=-\frac{L_P}{2}}^{\frac{L_P}{2}} \sum_{j=-\frac{L_P}{2}}^{\frac{L_P}{2}} \{P(i, j)Q(i-x, j-y)\}$$

From Equation 3, it can be determined that in order to obtain movement of the image, one must obtain P(i,j) for a first captured image, and then after obtain Q(i,j) for a second captured image. Thereafter, the values of x and y are moved throughout the entire image area and Equation 3 is evaluated at each point. The maximum of R(x,y) will indicate the point at which the cross correlation is maximum, and will thus indicate the distance which the image has moved.

In one embodiment, this cross-correlation is determined by one digital signal processor while the tilt and rotation of the mouse is determined by a separate digital signal processor. Such an embodiment is shown in FIG. 10 with digital signal processor block 310 representing two separate digital signal processors.

Thus, the process of FIG. 27 is able to determine the left-right tilt, the forward-backward tilt, the rotation, the height, and the x-y translation of the mouse. In an evaluation of some embodiments, most standard deviations of the tilt measurements were less than 0.1 degrees, and all standard deviations of the tilt measurements were less than 0.3 degrees.

Three-Dimensional Object Manipulation

Figure 45:
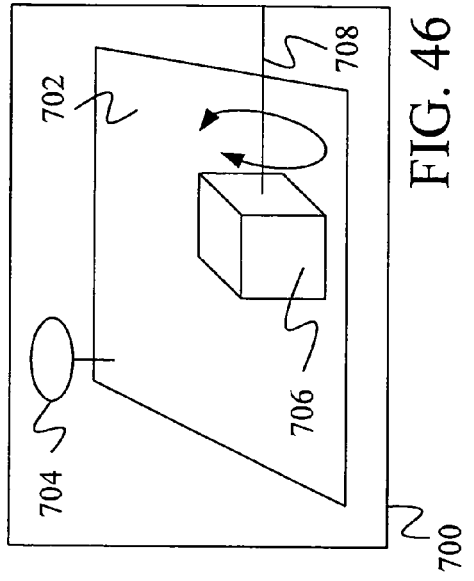
FIG. 45 shows a display with a three-dimensional scene showing rotation of a cube about a vertical axis.
Figure 46:
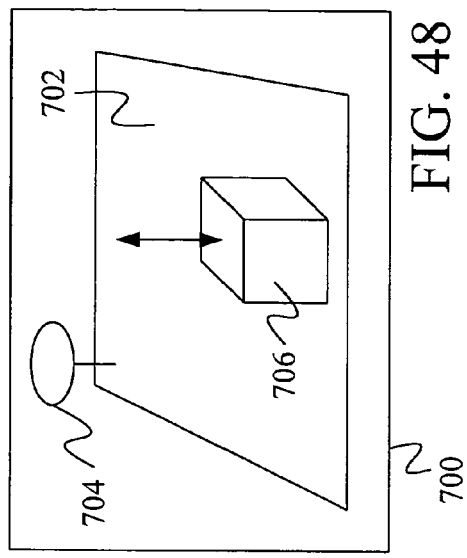
FIG. 46 shows a display with a three-dimensional scene showing rotation of a cube about a lateral axis.
Figure 47:
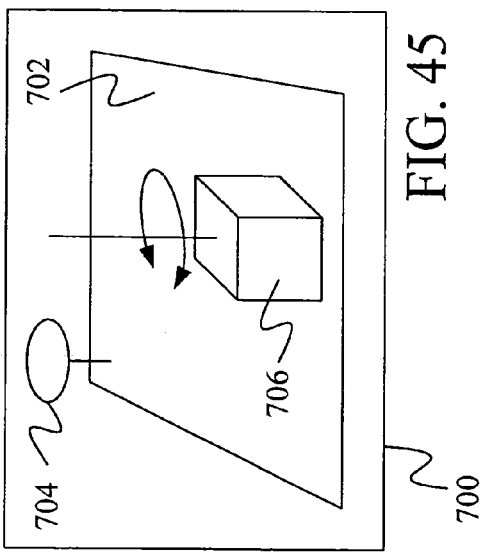
FIG. 47 shows a display with a three-dimensional scene showing rotation of a cube about a second lateral axis.
Figure 48:
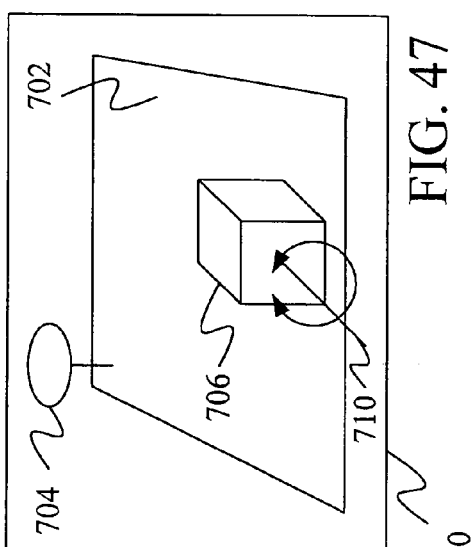
FIG. 48 shows a display with a three-dimensional scene showing vertical translation of a cube.
Figure 49:
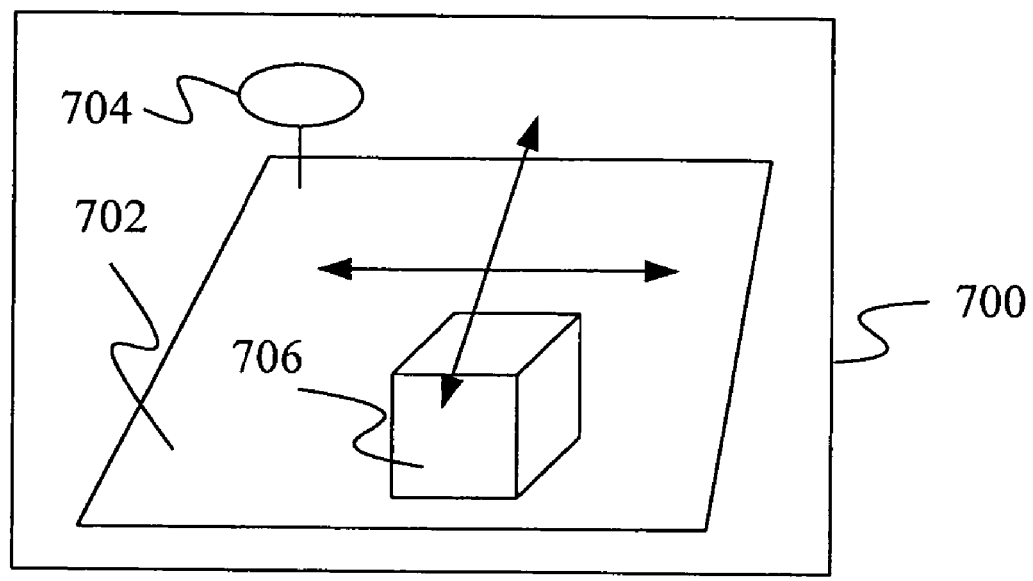
FIG. 49 shows a display with a three-dimensional scene showing left-right and depth translation a cube.

With appropriate interaction techniques, the additional degrees of freedom provided by the mice of the present invention can support many three-dimensional object manipulation tasks. FIGS. 45, 46, 47, 48, and 49 show a display 700 that provides an image of a three-dimensional environment, which contains a plane 702, a tree 704 and a cube 706. Under some embodiments of the invention, a user can move cube 706 along all six degrees of freedom within the three-dimensional environment by using a mouse of the present invention. Thus, by rotating the mouse about a vertical axis as shown in FIG. 23, the user can rotate cube 706 about a vertical axis as shown in FIG. 45. By tilting the mouse forward or backward the user can rotate the cube about a lateral axis 708 as shown in FIG. 46 and by tilting the mouse left or right, the user can spin the cube about a second lateral axis 710 as shown in FIG. 47. The user can control the height of cube 706 relative to plane 702 as shown in FIG. 48 by lifting and lowering the mouse relative to the pad. Lastly, the user can move cube 706 forward and backward in the three-dimensional space by moving the mouse forward and backward across the pad and can move cube 706 left and right in the three-dimensional space, as shown in FIG. 49, by moving the mouse left and right across the pad.

In some embodiments of the invention, rotation of the mouse about the vertical axis is mapped directly to rotation of the object on the screen. Thus, when the user rotates the mouse, the object rotates. When the user stops rotating the mouse, the mouse stops rotating. Different embodiments of the invention rotate the object by different amounts for a given rotation of the mouse. However, in most embodiments, a single unit of mouse rotation is mapped to between two units of display rotation and five units of display rotation. In one particular embodiment, one unit of mouse rotation is mapped to four units of display rotation. In such an embodiment, rotating the mouse a quarter turn to the left causes a full rotation of the object on the screen.

In some embodiments, the user is able to set the ratio between the mouse rotation and the displayed rotation using a user preference interface on a computer display. The rotation about the vertical axis is sensed precisely enough that a relatively high ratio can be used to allow an extended range of motion that overcomes the bio-mechanical limits of the hand while still allowing precise rotation.

Since the present mouse is able to detect rotation about the vertical axis, it is able to compensate for unintentional rotation of the mouse when it is being slid across the pad. This unintentional rotation arises as the mouse is translated across the pad because during such translation the user's hand may rotate at the wrist, elbow, or shoulder. Compensation for such unintentional rotation is implemented in some embodiments by ignoring small rotations of the mouse if the mouse is being moved across the pad at the same time. In other embodiments, all rotations of the mouse are ignored unless the user depresses a key on the keyboard or other input device during the rotation. Note that even when unintended rotation occurs, the rotation can be quickly corrected with a final ballistic rotation of the mouse.

In some embodiments of the invention, rotation of the mouse about the vertical axis is mapped to a rate of rotation on the display. Thus, the deflection of the device from the start of the rotation controls the velocity of rotation rather than the absolute rotation angle itself. One advantage of using a rate mapping is that a reclutching mechanism is not necessarily needed. By rotating and holding the device, the virtual object will continue to spin until it approaches the desired rotation. With an absolute mapping, when a physical limit in the rotation is reached, the user must "ratchet" the object by releasing the rotation key (or by lifting the mouse), reset the orientation of the mouse, and then rotate the mouse some more.

For embodiments that use a rate mapping, the velocity for a given mouse rotation is typically calculated with a nonlinear mapping. A small dead band of ±2° is usually provided so that the rotation can be brought to a definite stop. The resulting equation is:

$$dR_z = sgn(R_z) * K * \max(\|R_z\| - R_{zmin}, 0)^\alpha \qquad \text{EQ. 4}$$

where $dR_z$ is the displayed rotational velocity, K is the control gain, $R_z$ is the rotation of the mouse about the vertical (z) axis, $R_{zmin}$ is the size of the dead band, and $\alpha$ is the nonlinear parameter. The sgn function multiples by the sign of $R_z$ to keep $dR_z$ in the same direction as the rotation.

Under several embodiments of the invention, rate mappings are also used when the mouse is tilted forward, back, left or right. A rate control is effective for the tilt axes because most mice of the present invention naturally return to their bottom flat surface when they are released by the user. Since this orientation is mapped to zero rotation, the user is able to stop rotation simply by releasing the mouse. In addition, tilting with a rate control allows the user to either quickly spin the object with a large tilt, or to very precisely nudge the rate with a subtle tilting of the hand. The tilt velocity is calculated using equation 4 above, while substituting the tilt angle for the angle of rotation about the z-axis. In many embodiments, a dead band of ±2° is provided for each axis of tilting so that slight accidental tilting of the device, or inaccuracies in the tilt data, do not affect the orientation of the three-dimensional object being controlled.

Although rate mapping is used for forward-backward and left-right tilting under many embodiments of the invention, other embodiments of the invention use position mapping for such tilting. Further, under some embodiments of the invention, the mapping associated with titling or rotating the mouse is set by the particular application and the same movement of the mouse may be mapped to a position in one application and a rate in another application. Under one embodiment of the invention two different mapping techniques are used in the same application for the same device. Specifically, a positional mapping is used for rotation about the vertical axis while rate mappings are used for forward-backward and left-right tilting.

Although the present mouse is a six-degree of freedom sensing device, under some embodiments of the present invention, only five degrees of freedom are used for three-dimensional object manipulation. Lifting the device (Z-axis translation) under these embodiments is interpreted as a mouse reclutching or repositioning gesture. This style of usage is most similar to the traditional mouse wherein no matter what the user is doing with the device or what the mode of the software, lifting the device can be depended upon as a gesture to separate device motion from the virtual object or cursor motion. In some of the embodiments that usually ignore vertical movement of the mouse, the user can cause an object to track the vertical movement of the mouse using a keyboard modifier key or a button on the mouse.

In other embodiments of the invention, the user can select between manipulating the object with five degrees of freedom or with two degrees of freedom. For example, in some embodiments, when a modifier key is depressed while moving the mouse, the selected object may be moved along five degrees of freedom. Releasing the modifier key drops the object at its current position and orientation and allows the user to move the object in two degrees of freedom. The modifier key can be a key on the keyboard or a button on the mouse. One advantage of using a keyboard modifier, however, is that it separates the clutch from the hand controlling the device, which allows better fine motor control.

Preventing Accidental Mouse Button Events

During forward tilting, users may sometimes accidentally press one of the buttons located on the front of the mouse. Under some embodiments of the invention, button "clicks" are ignored if the tilt of the mouse is changing during the button "click". Thus, some embodiments of the present invention are able to determine when the user intended to press a button and when the user accidentally pressed the button during mouse movement.

Two-Dimensional Document Navigation

Input devices of the present invention allow for easy navigation of large two-dimensional documents. Navigating such spaces with standard scroll bars is quite tedious. Not only do scroll bars control only one dimension of panning at a time, but also a distant destination for navigation may be beyond the edges of the screen, and thus invisible to the user. The user must either remember where other information is in the document space, or search for the desired destination while scrolling.

One approach of the prior art to overcome the limitations of scrolling is to use a menu to change the magnification of the document so that more area can be seen, select a new region, and then revert the magnification to the original setting. However, this also is a tedious process involving many steps which interrupt the user's workflow. Some mice with wheels can support this functionality by holding down a modifier key and rolling the wheel to zoom, but the navigation occurs in discontinuous steps, which can cause the user to get disoriented, and is still disjoint from the mechanism to select a new region.

Figures 50, 51:
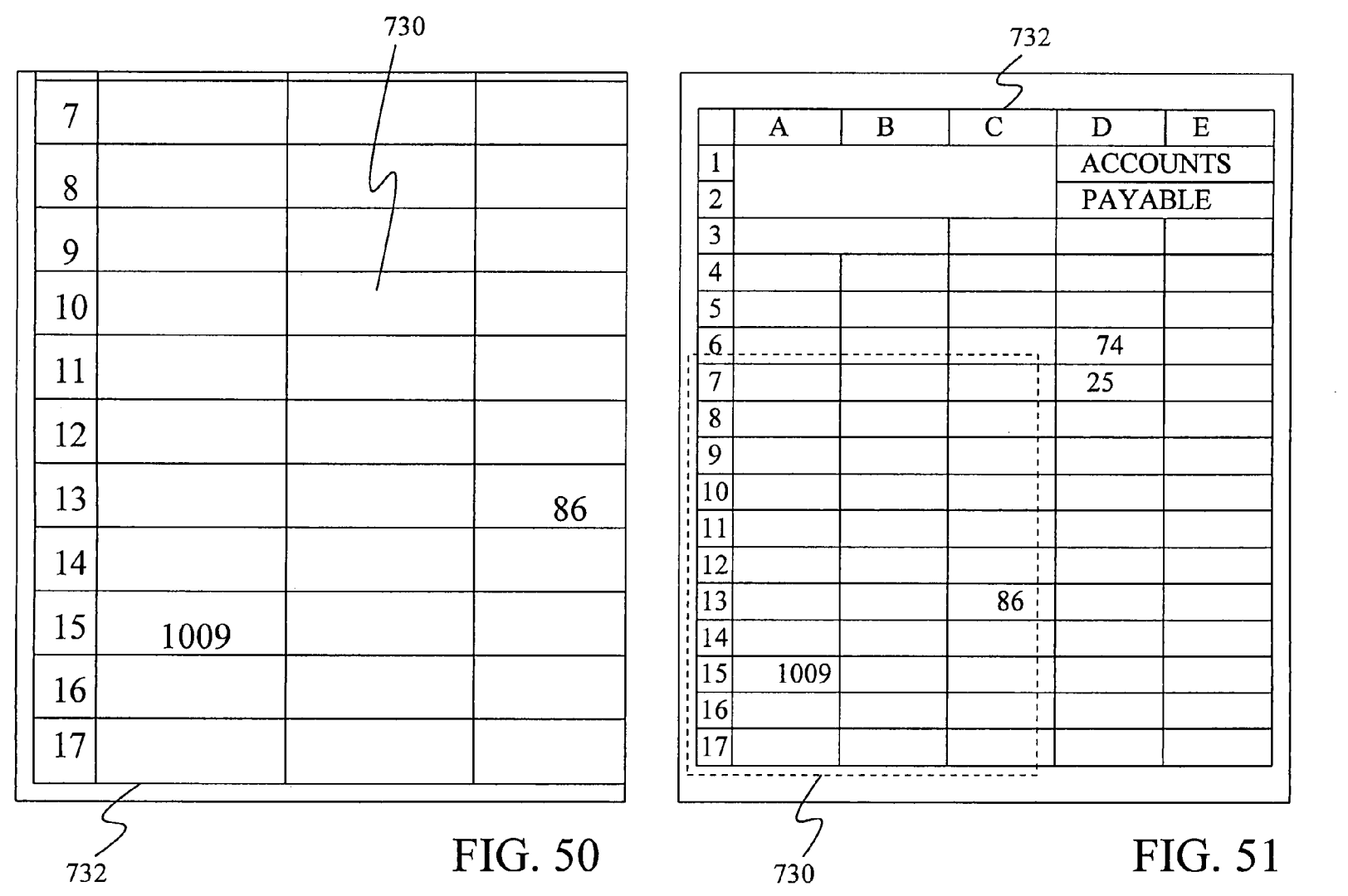

Under embodiments of the present invention, tilting the mouse forward or back is interpreted as a distinct gesture to "zoom out" to an overview of the two-dimensional document. An example of the result of such a "zoom out" can be seen by comparing FIGS. 50 and 51. FIG. 50 provides a view of a portion 730 of a two-dimensional spreadsheet 732 before the mouse is tilted forward or backward. After the mouse is tilted, some embodiments of the invention show a continuous animation of spreadsheet 732 as the viewpoint of the spreadsheet is moved back. During this animation, the contents of the spreadsheet get smaller while the amount of the spreadsheet that can be seen increases. At the end of the animation, the display contains the image of FIG. 51 where previously displayed portion 730 is shown in a dotted box.

The zooming effect is combined with normal two-dimensional motion of the input device under some embodiments of the invention. This allows the user to move a semi-transparent selection region, such as the dotted box of FIG. 51. Releasing the mouse button then flies the user into the new region of the spreadsheet indicated by the selection region. Images generated by such embodiments are shown in FIGS. 52 and 53. In FIG. 52, the user has moved a semi-transparent window 736 to the upper right corner of spreadsheet 732 while the mouse is tilted to provide a larger view of the spreadsheet. When the user returns the mouse to its resting position or releases the mouse button, an animation is displayed in which the view point moves toward semi-transparent window 736. The resulting view is shown in FIG. 53 where semi-transparent window 736 is completely transparent and the portion of the spreadsheet that was beneath window 736 occupies the entire window assigned to the spreadsheet.

Under several embodiments, the tilt angle is scaled by a gain factor to allow continuous control of the height of the camera above the spreadsheet. This is an example of an absolute mode for mapping the tilt data to height. In other embodiments, a rate mapping is applied to the tilt angle(s) to zoom out at a rate proportional to the amount of tilting. The mapping for this is similar to that of Equation 4, except a rate of zooming (rather than a rate of rotation) is calculated. In other embodiments, quickly tilting the device up and then back down is used as a discrete gesture to "show more" of the spreadsheet. This gesture backs out to a fixed overview, and then the user can move the mouse around (while flat on the desktop) to position the selection region. In some embodiments, a series of such gestures cause the view to continue backing out to higher and higher overviews. Note that under most of these embodiments, the displayed information remains in a plane that is parallel to the display during zooming.

In some embodiments, the view zooms out whether the mouse is tilted forward or back. In other embodiments, tilting in one direction causes the view to zoom out and tilting in the other direction causes the view to zoom in for more detail.

Reclutching Detection

Because embodiments of the present use a video camera to determine the position of the mouse, the mouse does not have a built-in mechanical reclutching or repositioning gesture. Thus, under some embodiments, special processing is performed by the digital signal processor or the pose estimator to detect when the user has repositioned the mouse on a new part of the pad rather than moving the mouse across the pad to control a cursor or object. This processing uses the mouse height and tilt angle to sense when the user has lifted the mouse to reposition it at a new location.

Note that one cannot use the height parameter alone to make this determination because the height parameter can change when the mouse is simply tilted on the pad. To account for this, the reclutching method uses a maximum and a minimum nonlinear height threshold function based on the current tilt angles. If the height exceeds the maximum threshold for the current tilt of the mouse, the mouse is considered to have been lifted in a reclutching gesture. When the sensed height returns below the minimum threshold after exceeding the maximum threshold, the reclutching gesture is considered to have ended. In some embodiments, separate minimum and maximum thresholds are used so that slight noise in the height sensing (or from hand tremor) will not result in unstable switching between the two states. It is also possible to provide reclutching detection with a hardware switch that senses when the device base makes contact with a solid surface.

Mouse and Mouse Pad

One aspect of the present invention is a two-handed interaction technique where the user can rotate the pad with their non-preferred hand while either holding the mouse still with the preferred hand, or simultaneously counter-rotating the mouse to extend the continuous range of rotation beyond the bio-mechanical limits of the preferred hand acting alone. To allow easy rotation, some embodiments of the mouse pad have a raised pivot point which gives the pad a slight affinity to rotate about its center like a turntable, yet without feeling "wobbly."

Figure 54:
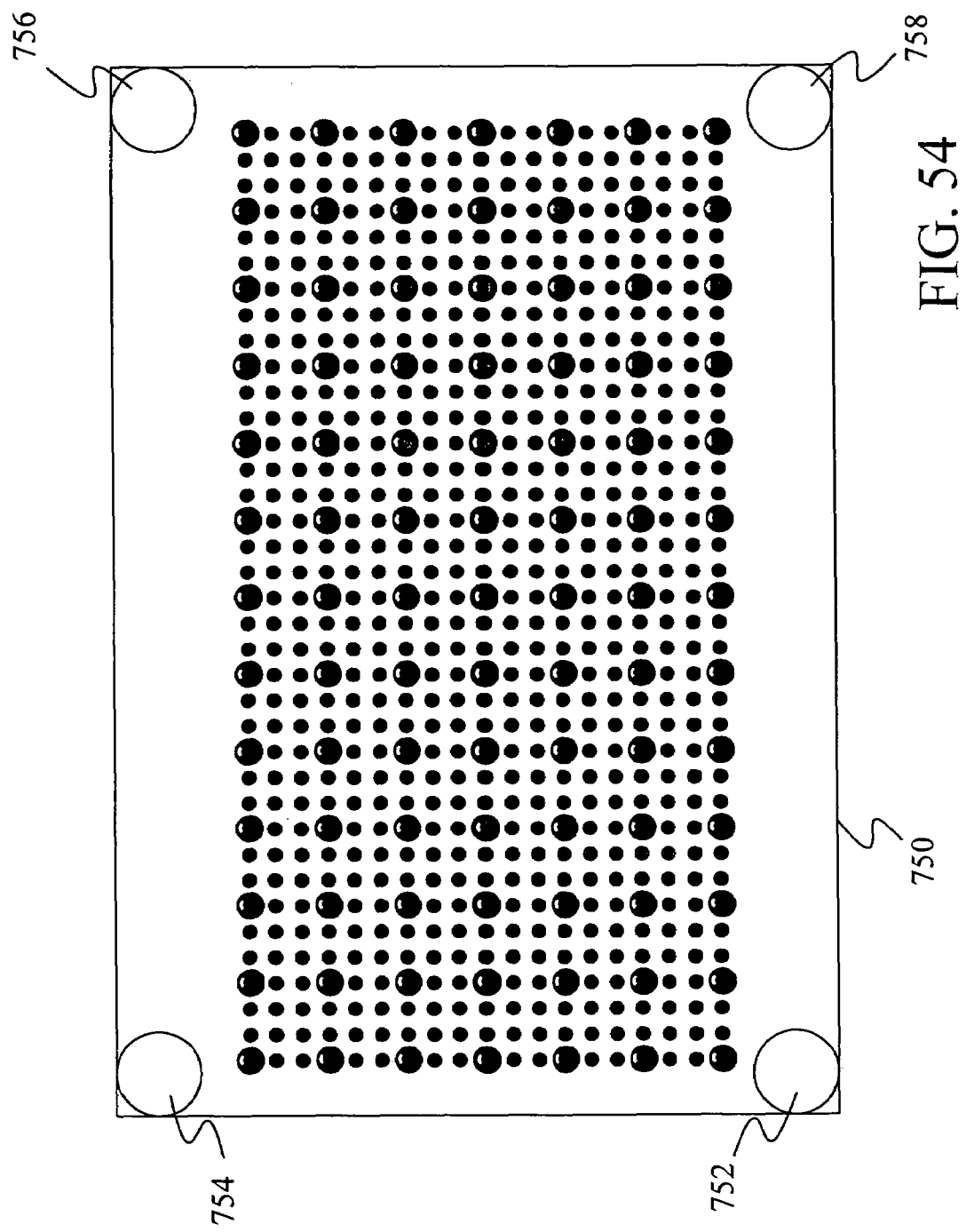
FIG. 54 provides a top view of a mouse pad of one embodiment of the present invention.

A further aspect of the invention is the inclusion of touch sensors in the mouse pad to indicate when the user is manipulating the mouse pad. An example of a mouse pad 750 with touch-sensitive finger-sized recesses 752, 754, 756, and 758 located in each corner of the pad is shown in FIG. 54. When the user places their finger in one of the recesses to rotate the pad, an electric signal is transmitted to the host computer to indicate that the mouse is being manipulated. In most embodiments this information is sent through a serial port interface in the host computer to a mouse pad driver that issues a pad event. An operating system then routes the pad event to applications that have asked for pad event notification.

Figure 55:
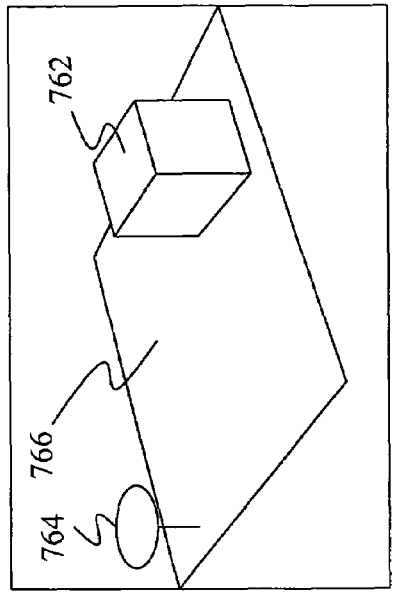
FIGS. 55, 56 and 57 provide selected images from a display showing rotation of a three-dimensional scene.
Figure 56:
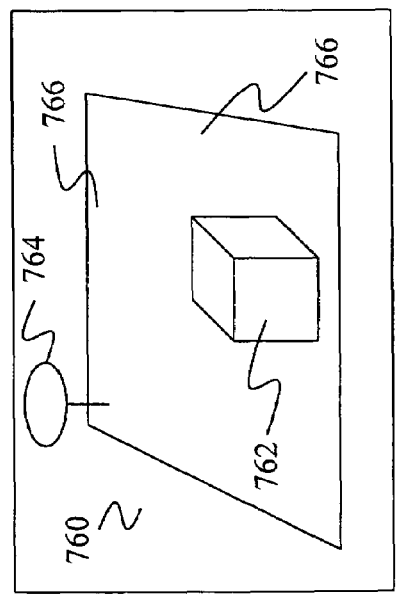
Figure 57:
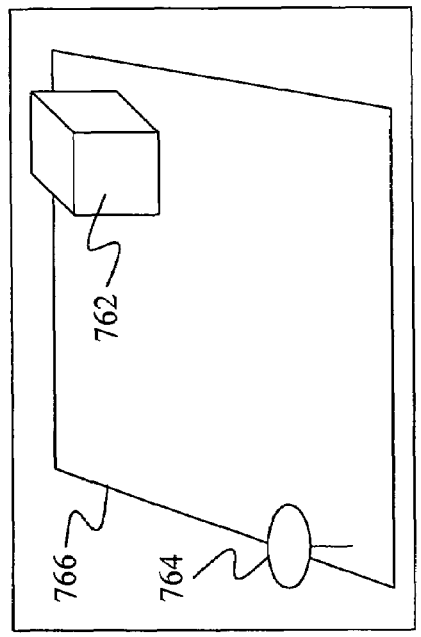

Under some embodiments, when the user is touching the pad, the mouse pad becomes a "prop" for rotating the scene or ground plane, while rotating the mouse by itself manipulates an object within the scene. FIGS. 55, 56 and 57 show the rotation of a scene 760 within a displayed three-dimensional environment when the user rotates the touch pad relative to the mouse. Thus, cube 762, tree 764 and plane 766 of scene 760 all rotate about the center of plane 766 from their starting positions in FIG. 55 through their intermediate positions in FIG. 56 to their ending positions in FIG. 57.

In most embodiments, the rotational gain factor is lowered when the user is rotating the mouse pad so that the user may rotate the scene slowly with the non-preferred hand or rapidly by simultaneously counter-rotating the mouse hand. For example, if the gain factor for rotation of the mouse causes four units of displayed rotation for each unit of mouse rotation, the gain factor for rotation of the pad causes two units of displayed rotation for each unit of pad rotation.

The user can also choose to move the mouse pad without triggering the touch sensors by simply grabbing it at any other point. This makes the gesture of grabbing the mouse pad to rotate the scene intentional, yet very easy to do.

In the user interface art, it is generally believed that users prefer objects to move in the same direction as the input device being used to manipulate them. This is known as kinesthetic correspondence. Contrary to this generally held belief, some embodiments of the present invention rotate the scene in the opposite direction from the direction the user rotates the pad. In such embodiments, the scene rotates as if the user were rotating the mouse instead of the mouse pad.

Lightweight Scanning

In some embodiments of the invention, the video camera that is used for determining the position and orientation of the mouse is also used for lightweight scanning. Specifically, it is useful for quick scanning tasks that are too cumbersome if the user has to put down the mouse to switch to a handheld scanner. For example, users can scan the title of a document. Such tasks can occur naturally when the user works with paper documents that have electronic counterparts. An example would be the processing of paper invoices that also exist as electronic records in a database.

To aid in scanning, some embodiments of the mouse include a physical registration mark on the side of the mouse to help line up the camera with the desired text. An example of such a mark is shown as registration mark 207 of FIG. 3.

Figure 58:
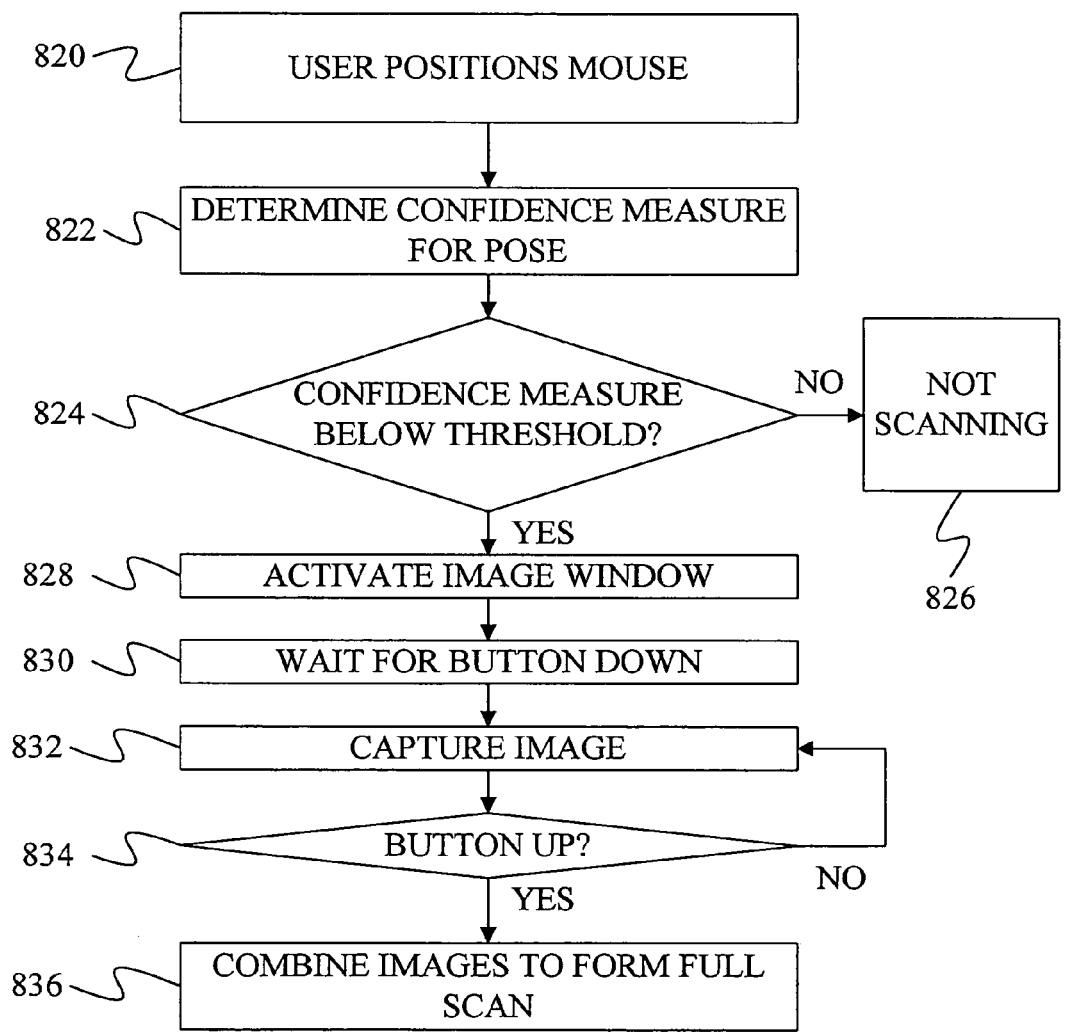
FIG. 58 provides a flow diagram for scanning under one embodiment of the present invention.

A method of scanning under an embodiment of the present invention is shown in the flow diagram of FIG. 58. The flow diagram of FIG. 58 is discussed below by making reference to a block diagram in FIG. 59, which is an expanded block diagram of mouse 260 and computer 262 of FIG. 9. Elements that are common to the diagrams of FIGS. 9 and 59 have the same reference numbers in the two figures and unless otherwise noted below, operate in the same manner.

The method of FIG. 58 begins at step 820 where the user positions the mouse. At its new position, camera 294 generates a new image that is captured by pose estimator 300. Pose estimator 300 uses this image to determine the position and orientation of mouse 260. As part of this determination, pose estimator 300 also generates a confidence measure that indicates the expected level of accuracy of the position information. This is shown as step 822 in FIG. 58.

Because the pose estimator provides better estimates when it is on a pad with a grid-like pattern, its confidence measure is considerably higher over the grid than when the user is trying to scan a document. As such, if the confidence measure is above a certain threshold at step 824 of FIG. 58, the system assumes the mouse is positioned over the grid and that the user does not want to scan. When the system determines that the user does not want to scan, the scanning method of FIG. 58 ends at step 826.

Figure 59:
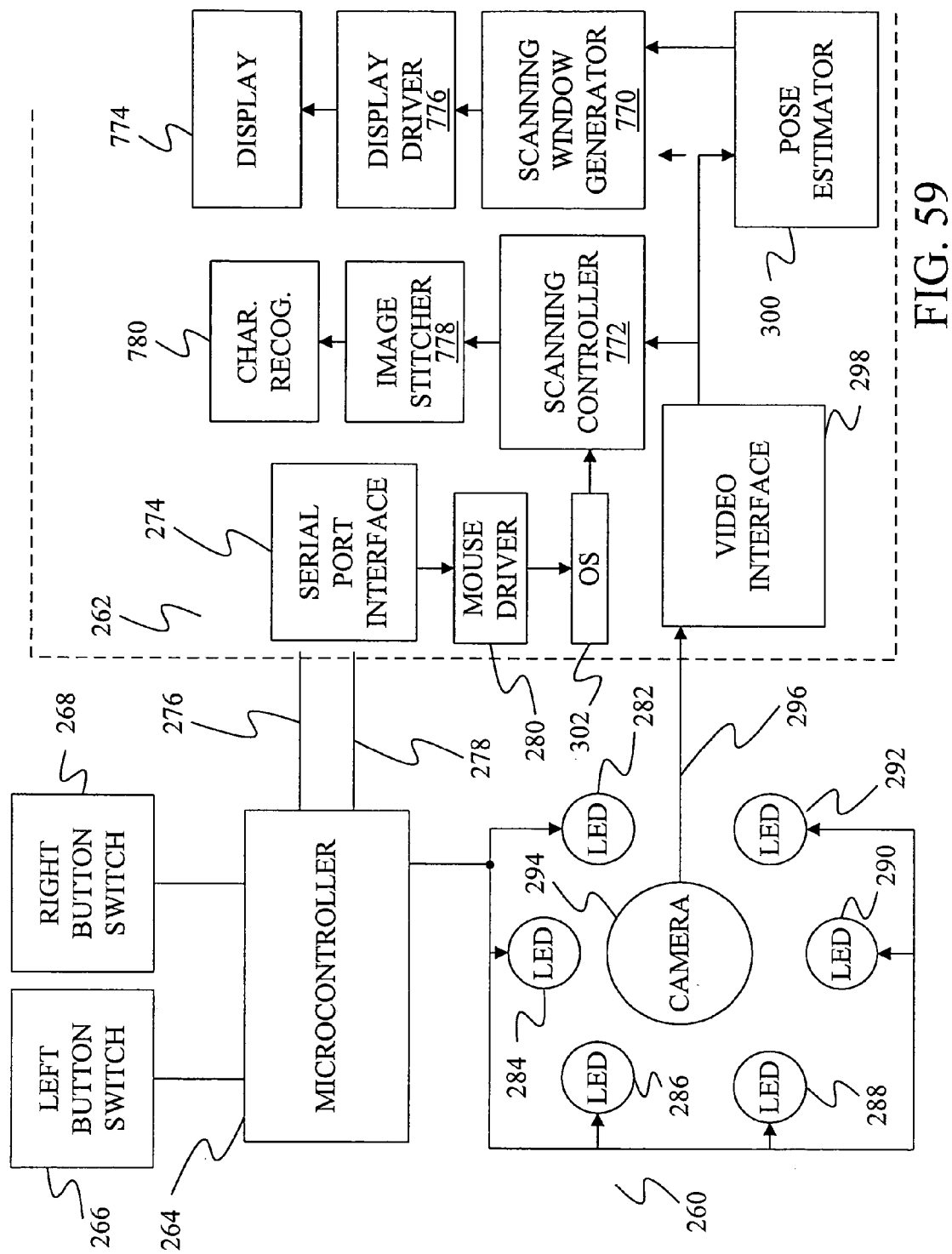
FIG. 59 provides a block diagram of an embodiment of a mouse and computer used in scanning under the present invention.

However, if the confidence measure is below the threshold at step 824, the process of FIG. 58 continues at step 828 where the pose estimator prepares the system for scanning by invoking a scanning window generator 770 and a scanning controller 772 of FIG. 59. Scanning window generator 770 receives image data from video interface 298 and defines a window in which the data is to be displayed on a display 774. Typically, the window and image data are provided to a display driver 776 that acts as an interface between scanning window generator 770 and display 774. The image provided in the scanning display window allows the user to see the image that will be scanned. This is helpful at the beginning of the scan because the mouse may obscure the portion of the text that will be scanned.

Figure 60:
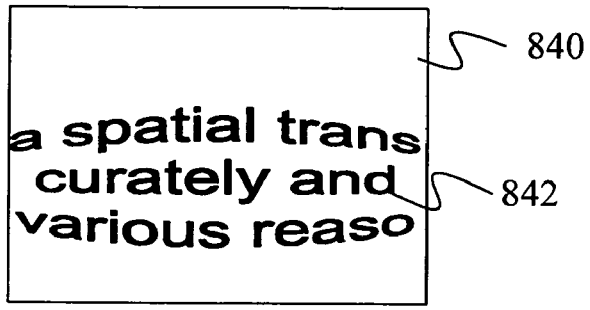
FIG. 60 provides an image of a scanning window.

An example of a scanning display window is window 840 of FIG. 60. In window 840 an image of text 842 that will be scanned or is currently being scanned is shown to the user. In other embodiments, the system prepares to scan, but the actual scanning window does not appear on the user's screen until the user holds down a mouse button or keyboard modifier key (at a time when the confidence threshold indicates that the grid pattern is not present).

After being invoked, scanning controller 772 registers with operating system 302 to receive mouse events. Specifically, scanning controller 772 is interested in button down and button up messages for the mouse button that controls when scanning begins and ends. After registering, scanning controller 772 waits for a button down message at step 830 of FIG. 58.

Scanning controller 772 also receives image data from video interface 298. When scanning controller 772 receives a button down message for the scanning button, it captures the current image produced by video interface 298 at step 834 of FIG. 58. This captured image is then provided to an image stitcher 778, which stores the image for later processing as discussed further below.

After capturing the current image, scanning controller 772 checks to see if a button up message has been received at step 834. If a button up message has not been received at step 834, scanning controller 772 returns to step 832 and captures a new scanning image. Since users typically move the mouse as they scan, the second image will be different from the first image. This second image is then provided to image stitcher 778. Steps 832 and 834 repeat until the user releases the scanning button.

When the user releases the scanning button at step 834, the process of repeating steps 832 and 834 has generated a collection of images that together represent the scanned portion of the document. In most embodiments, scanning controller 772 only passes a central slice of each captured image to image stitcher 778. Image stitcher 778 then combines these slices to form a complete scanned image at step 836 of FIG. 58.

Figure 61:
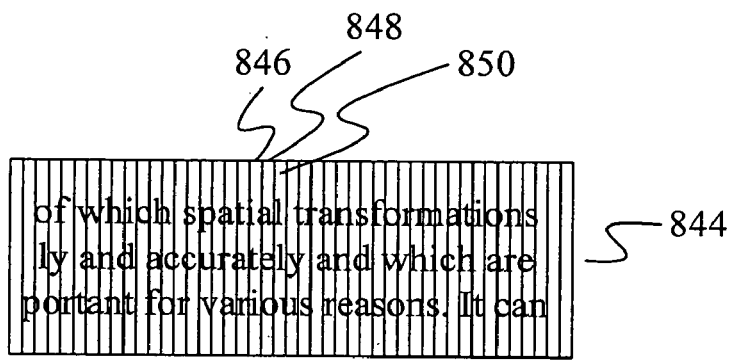
FIG. 61 provides an image of a mosaic of scanned slices.
Figure 62:
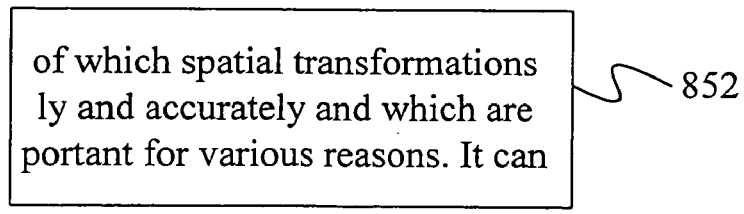
FIG. 62 provides an image of a full scan.

Typically, image stitcher 778 combines the image slices by assuming the user is keeping the mouse flat on the page. Using this assumption, image stitcher 778 first removes any radial distortion introduced by the camera and then estimates the amount of rotation and translation that occurred between image slices. Image stitcher 778 then aligns the image slices based on the estimated rotation and translation to form a mosaic of slices. An example of such a mosaic is shown in FIG. 61 where mosaic 844 is formed from a large number of image slices such as slices 846, 848, and 850. Note that in FIG. 61 all of the image slices are equally spaced for clarity. In practice, the user scans at a non-uniform rate causing the slices to overlap each other in a non-uniform manner. Once the image slices have been aligned, they are combined together using a logical AND operation to form a single scanned image. An example of a scanned image is image 852 of FIG. 62. In other embodiments, the slices are combined by averaging the contributions each slice makes to each pixel in the final image.

In some embodiments, once the scanned image has been formed, image stitcher 778 passes the scanned image to a character recognition program 780. Character recognition program 780 then scans the image in an attempt to identify characters in the image. If it can identify a character, it generates a corresponding character identifier (an ASCII value for example), which is then stored.

Audio Feedback

One aspect of the present invention is the use of audio signals to indicate the orientation and/or position of the mouse. Such signals give the user additional feedback for controlling the orientation and position of the mouse and help the user avoid unintended tilting or rotation of the mouse.

Figure 63:
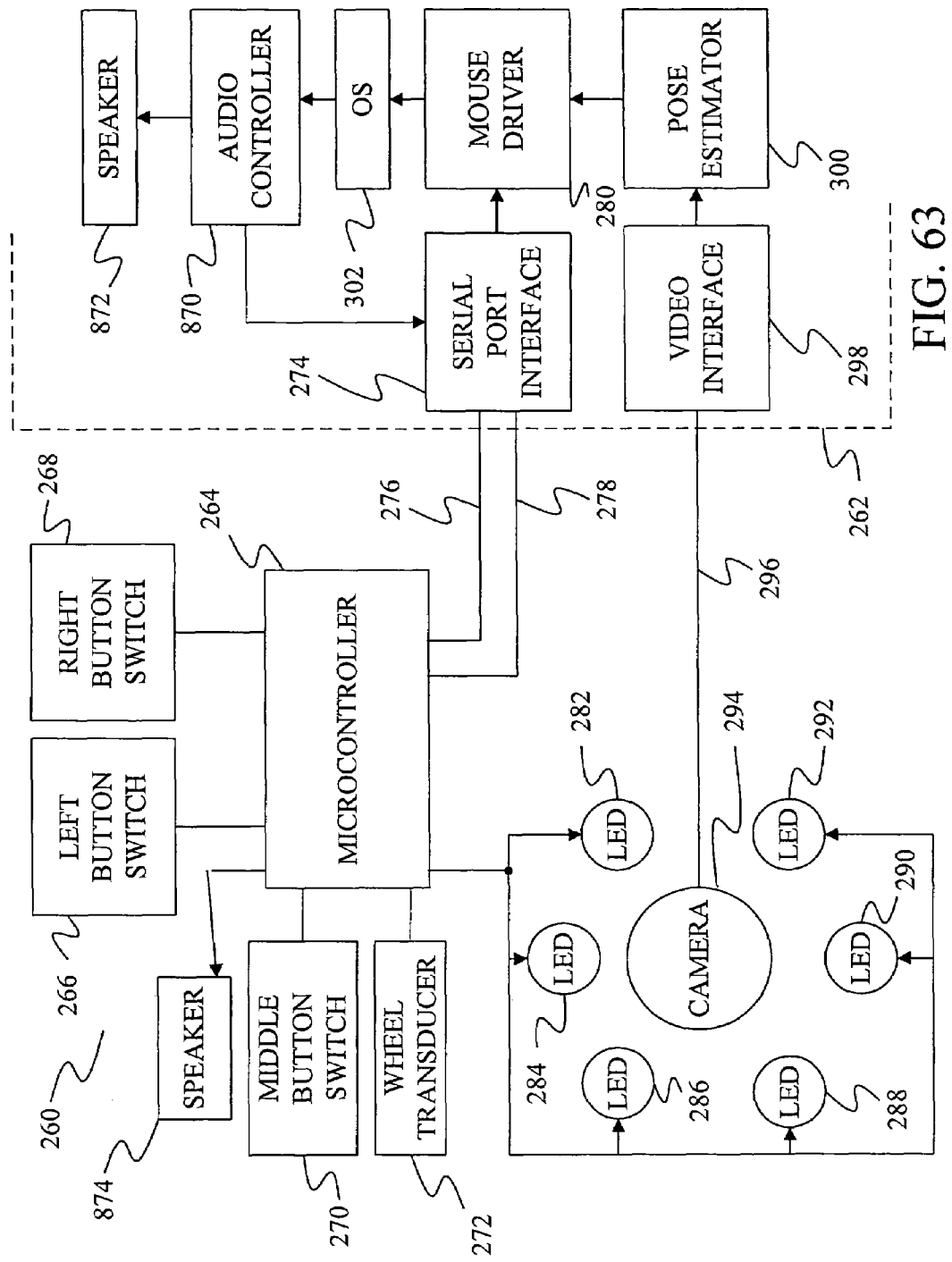
FIG. 63 provides a block diagram of an embodiment of a mouse and computer used in providing audio feedback to a user.

FIG. 63 provides a block diagram of a mouse and computer under the present invention for generating audio signals based on the orientation and/or position of the mouse. The elements of FIG. 63 that are common to the block diagram of FIG. 9 are similarly numbered and perform similar functions.

In FIG. 63, once pose estimator 300 has determined the orientation and position of mouse 260 based on an image from camera 294, it provides that orientation and position information to mouse driver 280. Mouse driver 280 combines the orientation and position information with the current state of the mouse buttons to produce a mouse message that is routed by operating system 302 to a group of applications. In the audio feedback embodiment of FIG. 63, one of these applications is an audio controller 870. Based on the orientation of the mouse, audio controller 870 generates an audio control message that is provided to a speaker 872 in computer 262 or to serial port interface 274. Generally, the audio control message will only be provided to serial port interface 274 when mouse 260 includes a speaker such as speaker 874. In embodiments that include such a mouse speaker, the audio control message is sent through serial port interface 274 to microcontroller 264 in mouse 260. Microcontroller 264 then drives speaker 874 based on the audio control message.

Under some embodiments of the invention, the audio feedback signals include a "click" to indicate when the mouse has been tilted and when it has returned to its neutral position. In other embodiments, the audio signals include signals that change in pitch as the degree of tilt or rotation of the mouse increases. In some embodiments, each axis of rotation or tilt is provided with its own signature sound.

Other embodiments of the invention provide an audio signal when the mouse is lifted of the pad and provide a small impact sound when the mouse is returned to the pad. Note that unlike a mechanical mouse, which makes a noise as it is lifted, mice of the present invention are almost perfectly silent when they are lifted without this audio feedback.

In other embodiments, the user hears a thudding noise when the mouse reaches the edge of the grid pattern; this makes the user aware of this error condition without having to visually monitor where the mouse is on the mouse pad.

Although specific examples of audio feedback have been listed above, those skilled in the art will recognize that a number of other qualities of the system can be sonified. For example, translating the mouse across the pad can cause a soft sliding noise to be generated that is proportional to the speed of movement.

Although the present invention has been described with reference to particular embodiments, workers skilled in the art will recognize that changes may be made in form and detail without departing from the spirit and scope of the invention. In particular, although a mouse-like shape has been used to describe the input device, other shapes are possible and are considered within the scope of the invention.

What is claimed is:

1. A computer input device and computer system, the input device and system comprising:
    an orientation sensing component determining the height of the input device relative to a working surface based on an image of the working surface captured by the input device;
    a controller, coupled to the orientation sensing component and generating an electrical signal based on the height of the input device; and
    an audio signal generator, coupled to the controller and generating an audio signal based on the electrical signal from the controller to indicate the height of the input device relative to the working surface.

2. The computer input device and computer system of claim 1 wherein the audio signal generator produces a sound that changes in pitch as the tilt of the input device increases.

3. The computer input device and computer system of claim 1 wherein the audio signal generator produces a sound when the input device is lifted off a working surface.

4. The computer input device and computer system of claim 1 wherein the audio signal generator produces a sound when the input device is replaced on a working surface.

5. The computer input device and computer system of claim 1 wherein the audio signal generator further produces a sound when the input device reaches the edge of a pattern on the working surface.

6. The computer input device and computer system of claim 1 wherein the audio signal generator is located within the computer input device.

7. A computer-readable medium for use in a computer system having an input device that is capable of sensing its orientation relative to a surface, the computer-readable medium having computer-executable instructions for performing steps comprising:

receiving an indication of the height of the input device relative to a surface from the input device;

identifying a sound value based on the height of the input device relative to the surface without regard to the content of a display; and driving a speaker separate from the input device based on the identified sound value.

8. The computer-readable medium of claim 7 wherein identifying a sound value comprises identifying a sound value associated with the input device being lifted off the surface.

9. The computer-readable medium of claim 7 wherein identifying a sound value comprises identifying a sound value associated with the input device being placed on the surface.

10. The computer-readable medium of claim 7 wherein driving a speaker comprises driving a speaker that is part of the input device.

* * * * *